United States Patent
Mann

(10) Patent No.: US 9,700,029 B2
(45) Date of Patent: Jul. 11, 2017

(54) DYNAMIC FISHING LURE SYSTEM AND METHOD

(71) Applicant: Robert Mann, Clearwater, FL (US)

(72) Inventor: Robert Mann, Clearwater, FL (US)

(*) Notice: Subject to any disclaimer, the term of this patent is extended or adjusted under 35 U.S.C. 154(b) by 0 days.

(21) Appl. No.: 14/952,044

(22) Filed: Nov. 25, 2015

(65) Prior Publication Data

US 2017/0071177 A1  Mar. 16, 2017

Related U.S. Application Data

(60) Provisional application No. 62/218,983, filed on Sep. 15, 2015, provisional application No. 62/222,545, filed on Sep. 23, 2015, provisional application No. 62/222,811, filed on Sep. 24, 2015, provisional application No. 62/209,571, filed on Aug. 25, 2015.

(51) Int. Cl.
- *A01K 85/01* (2006.01)
- *A01K 85/16* (2006.01)
- *H01R 13/52* (2006.01)

(52) U.S. Cl.
CPC .............. *A01K 85/16* (2013.01); *A01K 85/01* (2013.01); *H01R 13/5213* (2013.01)

(58) Field of Classification Search
CPC ...... A01K 85/00; A01K 85/01; A01K 85/005; A01K 85/018; A01K 97/00; H01R 13/447; H01R 13/5213; H01R 13/523; H01R 13/4538
USPC ............. 43/17.1, 17.5, 17.6, 26.2, 42, 42.31
See application file for complete search history.

(56) References Cited

U.S. PATENT DOCUMENTS

| | | | | |
|---|---|---|---|---|
| 3,239,791 A * | 3/1966 | Fyrk | .................... | H01R 13/447 439/144 |
| 6,108,962 A * | 8/2000 | Barron | .................... | A01K 85/00 43/17.6 |
| 6,647,659 B1 | 11/2003 | King et al. | | |
| 6,789,347 B1 | 9/2004 | West et al. | | |
| 7,125,295 B2 * | 10/2006 | Zhao | ...................... | H01R 11/12 439/287 |
| D532,783 S * | 11/2006 | Yu | ............................ | D14/480.3 |
| 7,160,157 B1 * | 1/2007 | Jones, III | ................ | H01R 11/11 439/288 |
| 7,383,659 B1 | 6/2008 | Honkanen | | |
| 8,199,470 B2 * | 6/2012 | Yang | .................... | H05K 5/0239 361/679.02 |
| 2004/0200125 A1 | 10/2004 | Albanito et al. | | |

(Continued)

*Primary Examiner* — Thien Thanh Pham
(74) *Attorney, Agent, or Firm* — Patent CEO, LLC; Phillip Vales

(57) ABSTRACT

A fishing lure representing a typical fish is formed from plastic or polymer. Embedded therein is provided a dynamic motion actuator utilized to attract fish by the continuous or random motion effected thereby. The device is powered by an onboard battery connected to a vibrational motor. A control circuit detects the water activation of the fishing lure and enables the motor and a lighting system for a predetermined sequence of activation and deactivation. An auxiliary control circuit senses connection of a USB to barrel connector power wire through a charging dock mounted in the frame of the fishing lure. Checking both a charging state and the number of times the device has been charged, the auxiliary control circuit enables a steady state light for signaling charging and a flashing light if the number of charges is above a certain level by using a counter.

2 Claims, 18 Drawing Sheets

(56) References Cited

U.S. PATENT DOCUMENTS

| | | | |
|---|---|---|---|
| 2005/0172533 A1* | 8/2005 | Fu | A01K 85/01 43/17.6 |
| 2009/0130875 A1* | 5/2009 | Guo | H01R 13/447 439/141 |
| 2010/0175304 A1* | 7/2010 | Barmore | A01K 85/01 43/17.6 |
| 2011/0030265 A1 | 2/2011 | Mancuso | |
| 2011/0099882 A1* | 5/2011 | Young | A01K 85/01 43/17.6 |
| 2013/0227874 A1 | 9/2013 | Dugan | |
| 2013/0333270 A1* | 12/2013 | Castaneda | A01K 97/00 43/17.6 |
| 2014/0026465 A1* | 1/2014 | Braun | A01K 85/01 43/17.6 |
| 2014/0080334 A1* | 3/2014 | Tetsuya | H01R 13/5213 439/136 |
| 2015/0128474 A1* | 5/2015 | James | A01K 85/16 43/17.6 |
| 2015/0208625 A1 | 7/2015 | Mann | |

* cited by examiner

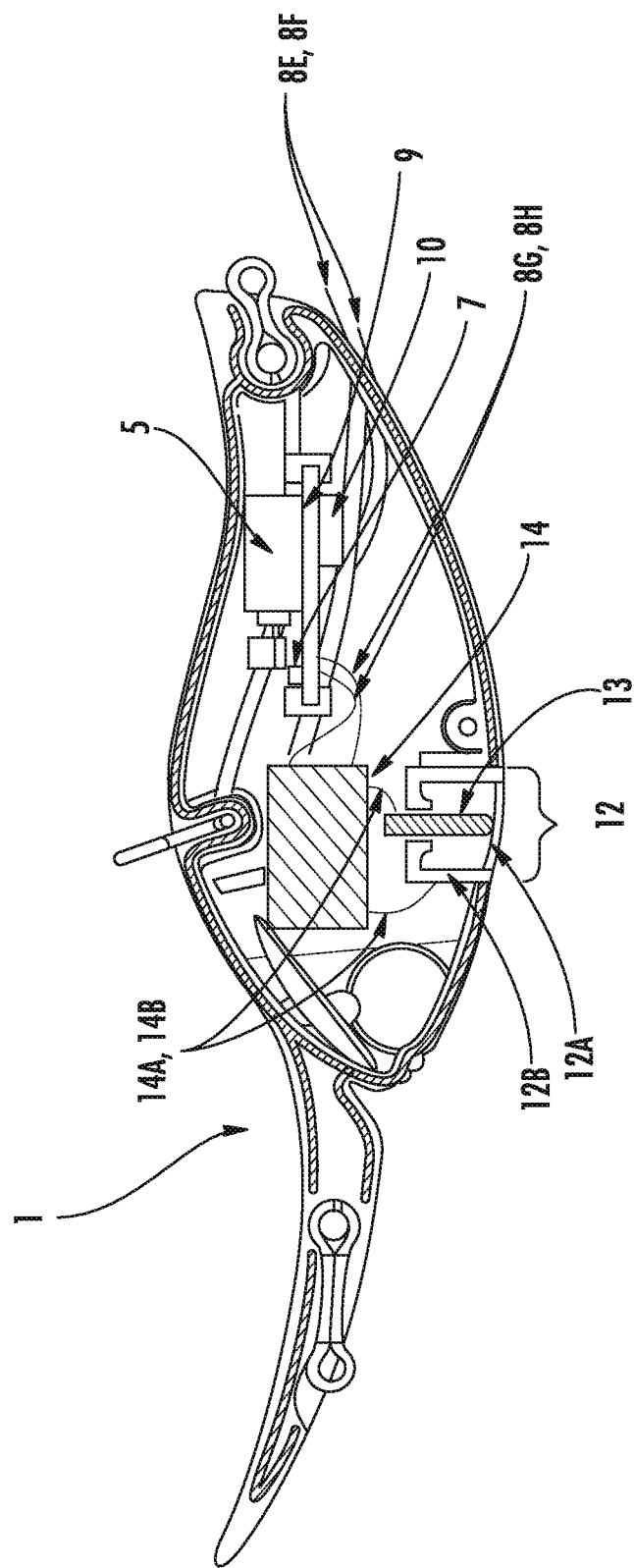

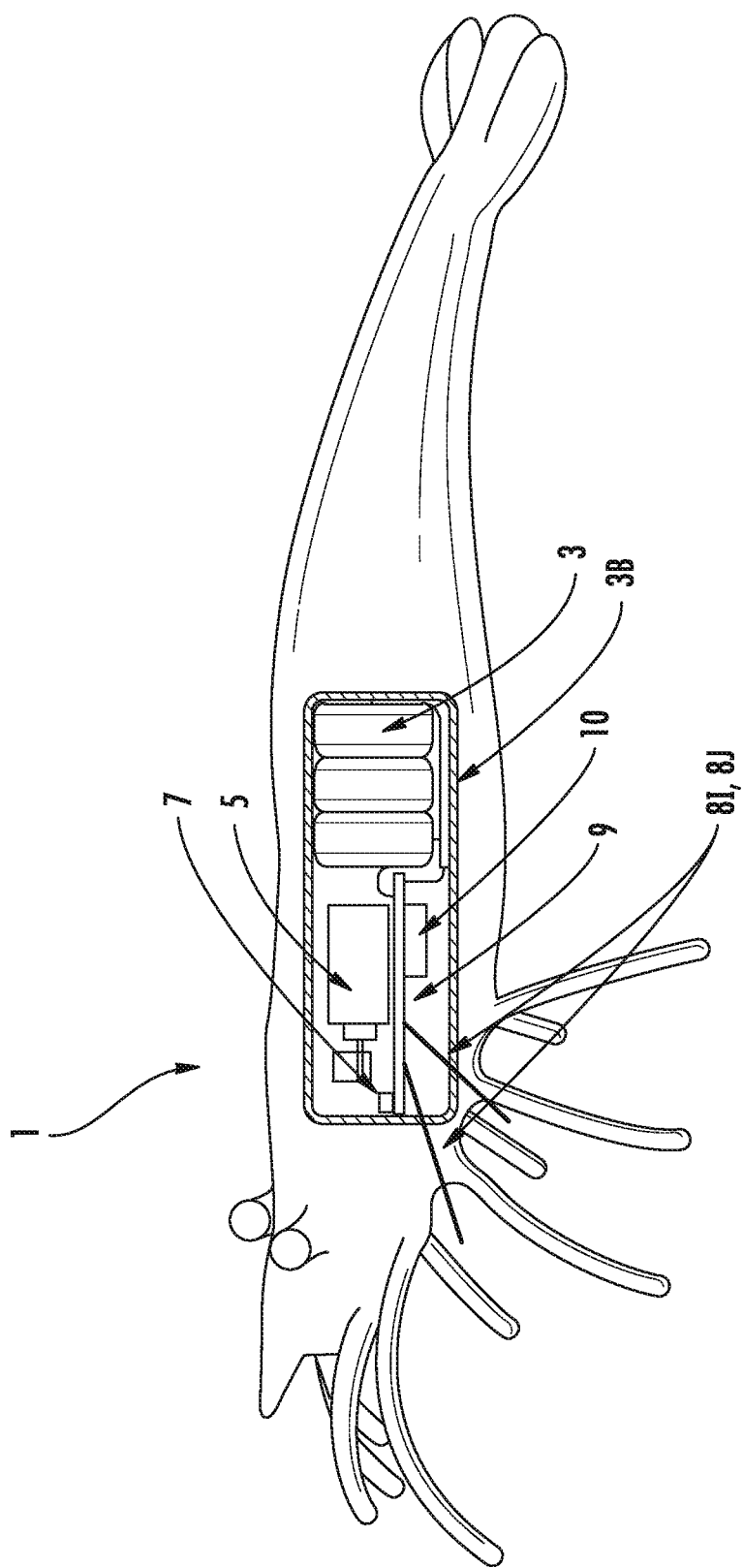

DYNAMIC FISHING LURE SYSTEM AND METHOD

CROSS REFERENCE TO RELATED APPLICATIONS

This application claims priority to U.S. Provisional Patent Application No. 62/222,811 filed 24 Sep. 2015, the entirety of which is incorporated by reference. This application claims priority to U.S. Provisional Patent Application No. 62/222,545 filed 23 Sep. 2015, the entirety of which is incorporated by reference. This application claims priority to U.S. Provisional Patent Application No. 62/218,983 filed 15 Sep. 2015, the entirety of which is incorporated by reference.

FIELD OF THE INVENTION

The present invention relates to devices that attract fish by providing some form of stimulus. More particularly, the present invention relates to an electronic fishing lure having dynamic characteristics that sufficiently fool the target fish in to believing that the lure is an actual prey; this thereby compels the target fish to bite the lure entangling it in the associated fishing hooks.

BACKGROUND OF THE INVENTION

Barrel Connectors

Coaxial connectors are utilized in various environments to facilitate charging of consumer electronic devices such as tape recorders and similar devices. Thus, these ubiquitous power connectors are used for attaching low voltage consumer devices to a power source. Commonly known as barrel connectors, concentric barrel connectors or tip connectors they come in a large variety of sizes currently available in the marketplace.

On the female Plug side, the outer body is metallic and cylindrical in shape, and comprises one of the two contacts. The second, inside contact is a hollow metallic cylinder constructed to accept insertion of the pin in the corresponding male connector. It should be understood that the inner and outer barrels are separated by an insulating layer. The outer contact is generally called barrel or sleeve, and the inner contact is called the tip. In the male Receptacle There is typically a single spring-loaded contact at the side of the male connector and a pin in the center corresponding to the intended female plug.

A typical device being charged by these devices has a central rod mounted on a small metal plate acting as a charging terminal; the small metal plate is then connected to internal circuitry of the device. This metal plate is placed within a mounting slot formed from the surrounding plastic material of the device. Once a top portion of the device is screwed together or locked in place with tongue and groove connection, for example, the device is ready for charging. The other charging terminal is formed by a corresponding cylindrical conductive side wall that concentrically surrounds the central rod described above. It is likewise encased in a plastic molded formed within the device and has an opening for attachment of the other electrical charging pole.

Vibration Motors

Small vibration motors have been around for several decades. They were originally developed for massaging products, but modern vibration motors rapidly expanded into the cellular phone market when consumers required vibrational alerts on their mobile phones. A typical cellphone vibration device has an eccentric mass attached to a motor, that is understandably known as an eccentric rotation masses (ERM) motors. Today, designers have learned from two decades of mobile phones how to make a variety of different types that have subsequently spread across a variety of technologies. Amongst these are miniature vibrating motors used in a wide range of products, like tools, scanners, medical instruments, GPS, and control sticks.

Enabling the motion of the device requires a suitable source of voltage and current. Because of this, ERM vibration motors are either directly connected to a voltage source or connected in series or parallel using a specifically designed control circuit such as a micro-controller chip on a circuit board, an IC circuit controller, a transistor based device, or other discrete glue logic devices accomplishing the appropriate control of ERM motor. All of these are within the level of the prior art.

Current Fishing Lure Technology

Modern anglers have used two main techniques to attract fish to their hooks. Typically, a combination of live bait and an attractive colorful lure have been utilized to affect both the physical senses of sight and taste of the fish as it swims in the water. Lures come in various shapes and sizes ranging from flexible strips to hard plastic man made fish. This latter type typically is composed of two half shells shaped and colored as a typical fish; the two shells mirror one another and are attached along their innermost edges as is known in the art either through adhesives, glues, tongue and groove locking or arrowhead slot type of connection; various combinations of these attachment schemes are known in the prior art.

The use of these lures has proven somewhat effective overtime thereby having the intended effect of bringing a fish to clamp down its mouth onto a lure having associated hooks. However, fish are wild animals with great experience and can sometimes ignore a lure and bait; as a consequence, the wait to get a good animal snared can last a long time. Thus, there needs to be some device to effectively convince the fish that a live fish is present thereby exciting the target fish to aggressively attack the lure, live bait and or attached hooks. Additionally, there needs to be a solution that is efficient, inexpensive, easily manageable, reusable and portable. Further, there needs to be a solution that can power a fishing lure without permitting seepage of liquids into the fishing lure as this must be robustly protected therefrom as this would disable its operation.

SUMMARY OF THE INVENTION

The present invention overcomes the deficiencies of the known art and the problems that remain unsolved by providing a novel Twitch Dynamic Fishing Lure.

A dynamic fishing lure comprising:
a fish structure having
an electric control circuit mounted therein;
a fishing hook holder mounted within the fish structure and extending out therefrom;
a battery in electric association with the electric control circuit and also mounted within the fish structure; and
a charging protrusion integral with and on an external surface of the fishing structure such that the charging protrusion has charging contacts embedded within it that are associated with the electric control circuit;

a triple sealing device entirely removable and re-attachable to the charging protrusion such that the triple sealing device has an integral curved cap portion and an integral cylinder portion; such that the integral cylinder portion has an external surface that impacts an internal surface portion of the charging protrusion; and further wherein the integral cylinder portion has a cavity that mounts onto one of the charging contacts mounted within the fish structure by insertion of said one of the charging contacts into the cavity; and the integral curved cap portion has an internal curved surface forming a space between this internal curved surface and a portion of the integral cylinder portion such that the internal curved surface impacts an external portion of the charging protrusion.

A dynamic fishing lure comprising:
a fish structure having
a battery re-charging electric control circuit mounted therein;
a fishing hook holder mounted within the fish structure and extending out therefrom;
a re-chargeable battery in electric association with the battery re-charging electric control circuit and also mounted within the fish structure; and
a battery re-charging protrusion integral with and on an external surface of the fishing structure such that the battery re-charging protrusion has a battery re-charging channel therein and battery re-charging contacts embedded within the battery re-charging channel such that the battery re-charging contacts are associated with the battery recharging electric control circuit wherein a battery re-charging increases an amount of charge stored on the re-chargeable battery;
a triple sealing device entirely removable and re-attachable to the battery recharging charging protrusion such that the triple sealing device has an integral bowl shaped curved cap portion and an integral cylinder portion mounted in a center of the integral bowl shaped curved cap portion; such that the integral cylinder portion has an external surface that impacts an internal surface portion of the battery re-charging protrusion; and further wherein the integral cylinder portion has a cavity that mounts onto one of the battery re-charging contacts mounted within the fish structure by insertion of said one of the battery re-charging contact into the cavity; and the integral bowl shaped curved cap portion has an internal curved surface forming a space between this internal curved surface and a part of the integral cylinder portion such that the internal curved surface impacts an external portion of the battery re-charging protrusion and wherein the space surrounds an entire perimeter of the part of the integral cylinder portion.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which:

FIG. 4 presents a component level diagram of various devices used to effect a third embodiment of the Twitch Dynamic Fishing Lure having a charging port and externally protruding open circuit.

FIG. 5 presents a component level diagram of various devices used to effect a fourth embodiment of the Twitch Dynamic Fishing Lure having a non-removable battery pack and externally protruding open circuit.

Like reference numerals refer to like parts throughout the several views of the drawings.

DETAILED DESCRIPTION

Figure 1A:
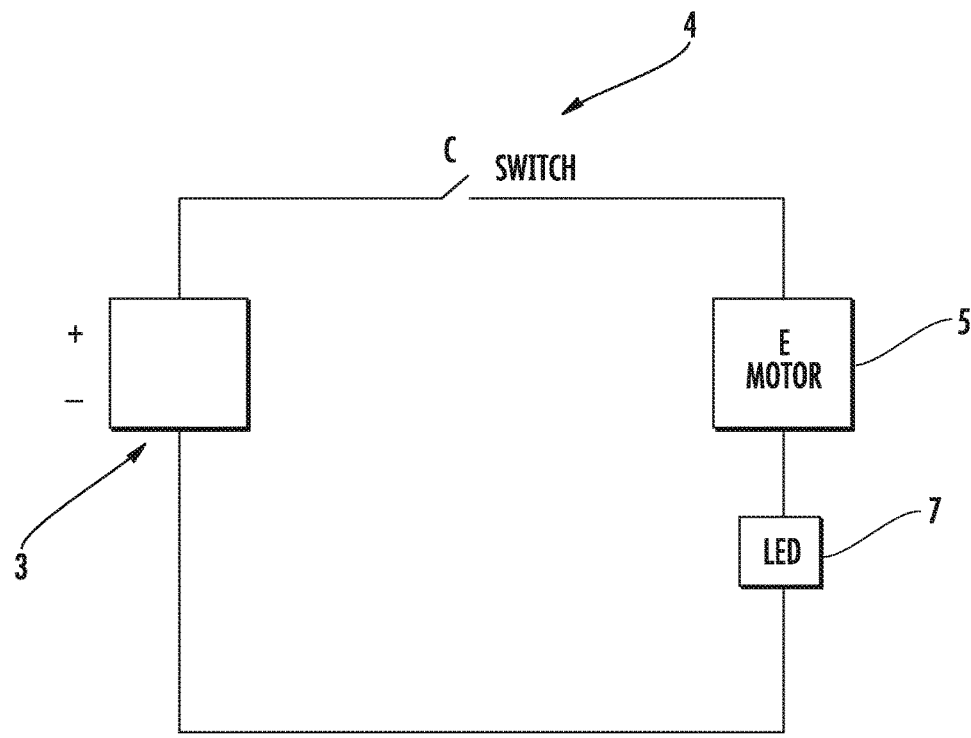
FIG. 1A presents a circuit level diagram for a Twitch Dynamic Fishing Lure having an electromechanical switch that is to be loaded within the shells of a plastic or polymer fishing lure in an embodiment.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in each figure.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A fishing lure 1 as taught herein is a dual shell device shaped as a fish, other aquatic animals, or simple geometric shapes made from plastic, polymer, rubber or similar materials having various Twitch Dynamic Fishing Lure devices therein; these are designed to effect a compelling reaction on nearby aquatic life. The primary device within the lure is an eccentric rotating mass (ERM) appropriately mounted within internal walls on either or across both corresponding shell(s) having recesses (form fitting slots, tongue and groove support, arrowhead on one shell to a hole snap fittings on a corresponding one etcetera or combinations thereof) for attachment of the base portion of the ERM by itself using glues, compression, screws or the use of an associated circuit board upon which the ERM is solder mounted or otherwise attached thereto. The rest of the circuit portions are similarly mounted within the shells of the lure and wired together as necessary to provide power to the devices therein.

The fishing lures come in two main types, namely, a switch activated device and an open circuit water contact activated device. The first as its name implies is activated through a user toggling the motion of the eccentric rotating mass on and off. The second type on the other hand, is more ingenious in that the open circuit protrudes out the side of the shells and are normally external thereto; then a user deposits the lure within a body of water. As a result, the circuit is activated once both ends of the open circuit have made contact with water thereby completing the open circuit therethrough.

FIG. 1A presents a circuit level diagram for a Twitch Dynamic Fishing Lure having an electromechanical switch that is to be loaded within the shells of a plastic or polymer fishing lure in an embodiment. A terminal of a source of power such as a battery 3 or battery pack is connected to one end of a switching device 4 and its other terminal is connected to an optional LED device 7 at a contact thereof; alternatively, it is directly connected to the ERM motor 5. It should be understood that the switch 4 protrudes outside of the shell of the lure and the internal contents of the lure are sealed against water leakage using glues, gaskets, rubber seal and the like. Further, the other contact of the optional LED device is connected to the ERM motor 5 that has its other contact connected to the other contact of the switch 4. Thus, when a user toggles the switch ON to OFF he stops the motion of the motor and OFF to ON a user causes the ERM mass to energize thereby causing the lure to move about. Once placed in the water it is an effective attractor of aquatic life.

Figure 1B:
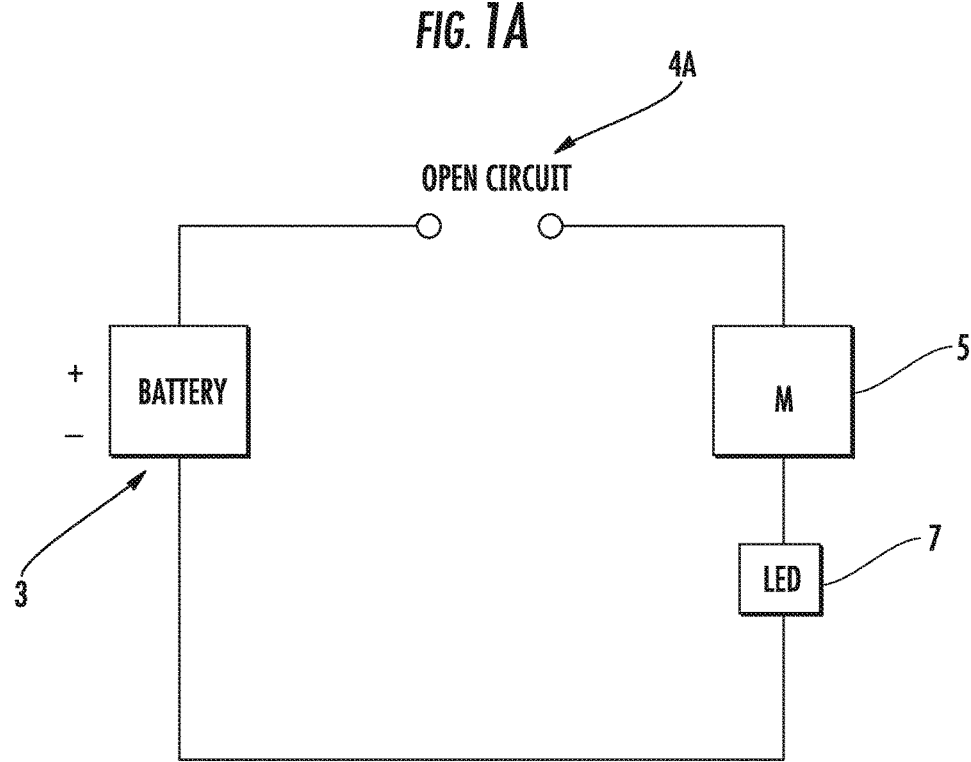
FIG. 1B presents a circuit level diagram for a Twitch Dynamic Fishing Lure having an open circuit that is to be loaded within the shells of a plastic or polymer fish in another embodiment.

FIG. 1B presents a circuit level diagram for a Twitch Dynamic Fishing Lure having an open circuit that is to be loaded within the shells of a plastic or polymer fish in another embodiment. A terminal of a source of power such as a battery 3 or battery pack is connected to one end of an open circuit 4A and its other terminal is connected to an optional LED device 7 at a contact thereof; alternatively, it is directly connected to the ERM motor 5. It should be understood that the open circuit 4A contacts protrude outside of the shell of the lure and the internal contents of the lure are sealed against water leakage using glues, gaskets, rubber seal and the like. In the optional case, the other contact of the LED device is connected to the ERM motor 5 that has its other contact connected to the other contact of the open circuit 4A. Thus, when a user places the lure in the water, electric current circulates through the water between the two contacts of the open circuit 4A thereby causing the ERM mass to energize and the lure to move about creating an effective attractor of aquatic life.

Figure 1C:
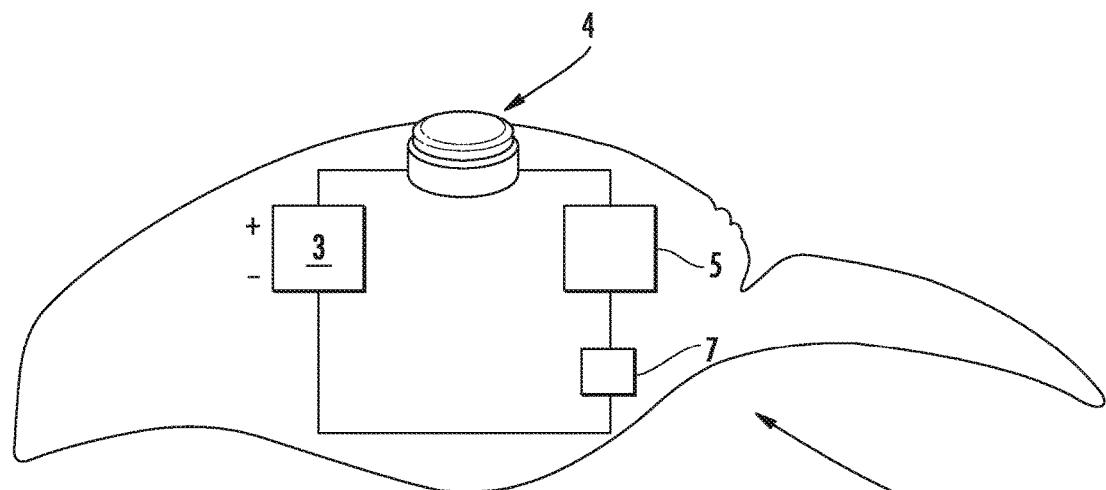
FIG. 1C presents a shell of fishing lure having a circuit level diagram for a Twitch Dynamic Fishing Lure having an electromechanical switch that is loaded within the shells of a plastic or polymer fishing lure in an embodiment.

FIG. 1C presents a shell of fishing lure having a circuit level diagram for a Twitch Dynamic Fishing Lure having an electromechanical switch that is loaded within the shells of a plastic or polymer fishing lure in an embodiment. Here the circuit of FIG. 1A is encapsulated within a dual shell fishing lure. An electromechanical push button switch 4 protrudes out of a hole in one of the shells of the lure or out of semi-circular holes in both shells that come together forming a single circular hole between the two shells; appropriate seals are provided to ensure that the internal contents of the lure are not contaminated by fluids.

Figure 1D:
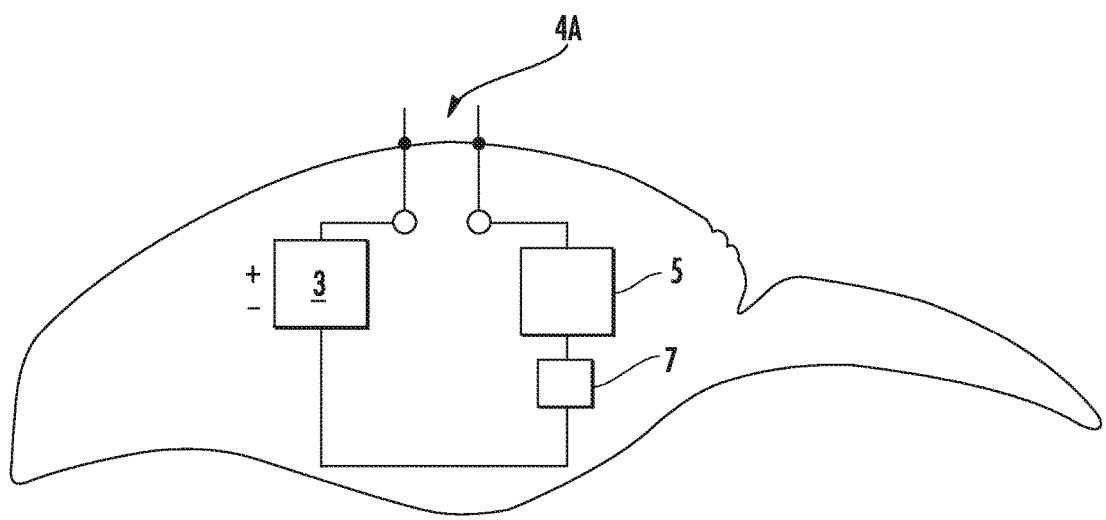
FIG. 1D presents a circuit level diagram for a Twitch Dynamic Fishing Lure having an open circuit progressing outside of the shells of the fishing lure; the circuit is loaded within the shells of a plastic or polymer fishing lure in this another embodiment.

FIG. 1D presents a circuit level diagram for a Twitch Dynamic Fishing Lure having an open circuit progressing outside of the shells of the fishing lure; the circuit is loaded within the shells of a plastic or polymer fishing lure in this another embodiment. Here the circuit of FIG. 1B is encapsulated within a dual shell fishing lure. Two contact wires protrude out the side of one shell or one each from each shell thereby forming an open circuit 4A; appropriate seals are provided about the wires to ensure that the internal contents of the lure are not contaminated by fluids. The wires are optionally turned back on themselves at their respective ends thereof thereby forming a round hole at each of their ends; this is to enable the attachment of fishing hooks within the aforementioned round holes; a variation of this has the wires formed as 'figure eights' as described below. Thus, it is envisioned that the wires are typically disposed underneath the lure for attachment of hooks thereon. However, the open circuit wires, figure eights or ends having round holes can be located anywhere on the body of the fishing lure that is deemed convenient.

Figure 2:
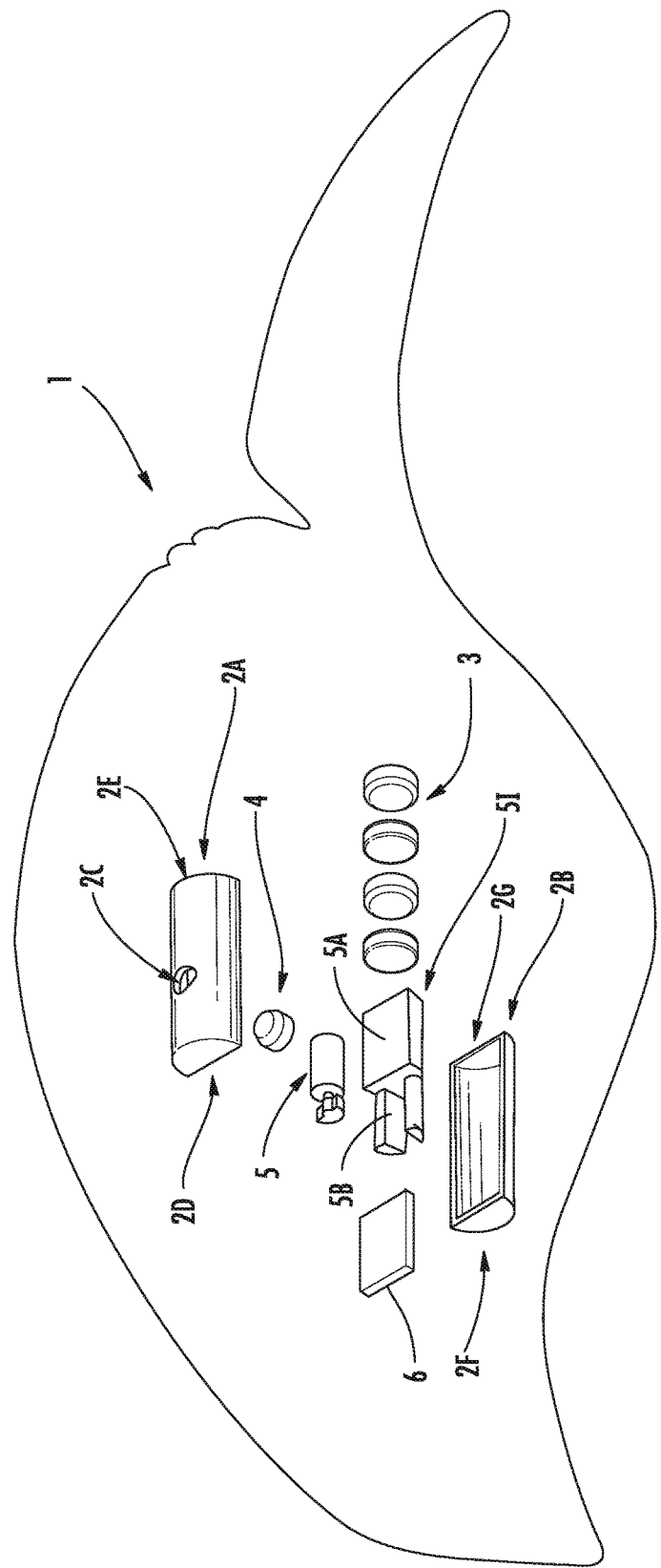
FIG. 2 presents a component level diagram of various devices used to effect an embodiment of the Twitch Dynamic Fishing Lure having a electromechanical switch.

FIG. 2 presents a component level diagram of various devices used to effect an embodiment of the Twitch Dynamic Fishing Lure having an electromechanical switch. As previously described two half shells are molded in the shape of an aquatic animal or a simple geometric shape. Within this dual shell is another dual shell or 'capsule' holding the components of the Twitch Dynamic Fishing Lure; this is comprised of two half cylindrical plastic shells 2A, 2B. Item 2A is a half cylindrical shell having two semicircular ends 2D, 2E and a perforation or hole 2C approximately a quarter to half way down the top surface thereof for placement of a switch button 4 therein; the bottom edges of the circular half shell 2A forming the cylinder are shaped as a rectangle that matches a corresponding rectangle on item 2B. This item 2B is a half cylindrical shell having two semicircular ends 2F, 2G and whose top edges matches in size and shape the bottom edges of the first half shell 2A.

The design contemplates having a tongue and groove contact with an appropriate triangular protrusion (or other shape)/hole locking mechanism so that the two do not disengage or slide away from each other; alternatively, the shells are glued together or similar connection schemes are used whilst the particular details are not shown for simplicity in the drawing. Thus, a protrusion at one edge of item 2A, 2B matches a corresponding hole at an opposing side of item 2B, 2A. The tongue on one item would match a corresponding groove on the other item thereby completing the locking of the overall internal shell. In this way, a tongue and groove system binds the half shells 2A, 2B together. Alternatively, a mounting system is devised of internal walls within the fish 1 shells thereby holding the shells 2A, 2B in place through a flange on one engaging an inwards directed overhang on another.

A battery motor holder device 51 is a molded plastic component that fits within the cylindrical shells 2A, 2B such that the underside 'portions' thereof match the inner surface of item 2B; in other words, it 51 has a curved shape underneath. The battery motor holder device 51 has a square or rectangular battery compartment 5A space having a curved bottom inner surface at its anterior end for holding various disk shaped batteries 3; this compartment 5A is separate but integral with the rest of the device SI having both forward and rear semicircular internal walls integral with the rest of the overall device. It should also be understood that the compartment 5A has fixed positive and negative metallic contacts 5C, 5D (not shown) attached in slots at the forward and rear semicircular wall thereof. Further, 5E, 5F wires are welded to these contacts so as to provide electrical power to the rest of the Twitch Dynamic Fishing Lure.

The rear or posterior portion 5B of the battery motor holder device SI has two longitudinal parallel wings 5G, 5H that jut out therefrom; these wings have a semi circular shape externally and opposing circular shapes within forming a motor holder clamp therein. Thus, the back of the motor 5 that is of similar size is inserted within the two wings 5G, 5H and held therein snugly. The contact switch 4 sits above the motor 5 and has an external lip that extends outwards as a flange; this flange prevents the switch 4 from exiting through the hole 2C in the capsule shell 2A.

Providing electric power from the batteries to the rest of the circuit is accomplished by a wired circuit that communicates current from batteries 3 through the circuit when the switch 4 is in its ON position and prevents the same when in the OFF position. A wire is welded to one terminal of a contact switch 4 and its opposite end is likewise welded to a terminal of the motor 5; the other terminal contact of the motor 5 is connected by wire to an optional circuit board 6 having an optional LED device soldered thereon; thus, the motor wire is welded/soldered to a terminal of the LED device. The optional circuit board 6 is loaded into a depression on the inner surface of the shell 2A and sits above the vibrational part of the motor 5.

In the event that the optional circuit board 6 is included, then another wire is welded to the other contact of the LED welded/soldered to the circuit board 6 and its opposite end is welded to the a terminal either of 5C, 5D of the battery holder 5A depending on the implementation. From there, another wire welded to the other terminal either of 5D, 5C has its opposite end welded to the contact switch's other terminal thereby completing the circuit. It should be understood that this motor 5 is an eccentric rotating mass type ERM motor (or similar vibration motor) that causes suitable vibration upon actuation of a push button switch 4 that sits atop the motor and is electrically connected thereto with suitably wiring. The switch is disposed to abut the non vibrational portion of the motor 5 thereby fixing it against the body thereof and the inside portion of shell 2A.

In the event that the circuit board 6 is excluded therefrom, the wire from the motor 5 that would have gone to the board 6 is instead extended to the battery compartment where it is welded to the other terminal contacts either of 5C, 5D of the battery holder 5A depending on the implementation. From there, another wire welded to the other terminal either of 5D, 5C has its opposite end welded to the contact switch's 4 other terminal thereby completing the circuit.

In this fashion it should be understood that this motor 5 is placed within the holder device SI posterior portion 5B behind the battery compartment 5A and separated therefrom. It should also be apparent that suitable wiring is included within the device to complete a DC circuit so as to energize the motor 5 when the push button 4 switch is turned ON; similarly, the internal nature of the switch 4 permits it being disconnected when it is turned OFF thereby cutting off electric power to the rest of the circuit. Appropriate optional internal mounts such as slots, grooves, walls are provided for the push button switch 4 and circuit card 6 but not shown for simplicity. It is also envisioned that a parallel circuit is also feasible according to circuit principles.

The assembled internal shell having the two half shells 2A, 2B form a 'capsule' and it and the contents thereof are placed within the confines of a plastic or polymer fish dual shell. The internal capsule composed of two half shells is optionally placed within internal mounts formed from internal plastic guides, protrusions, walls, grooves or other suitable shapes thereby fixing the position of the capsule so that it does not slide about within the volume of the fish. The external skin of the fish is similarly comprised of two outer shells that are locked together by a perimeter edge tongue and groove configuration; this is intended to permanently seal the package for later sale. Additionally, appropriate triangular protrusion-hole locking mechanisms so that the two outer shells do not disengage or slide away from each other are applied along the inner edges thereof. Optional rubber seals are applied along the inner and outer edges of the tongue and groove to prevent water from leaking therein. Glues and other materials such as rubber, nylon or other materials can be used to seal the device from water seepage.

Figure 3:
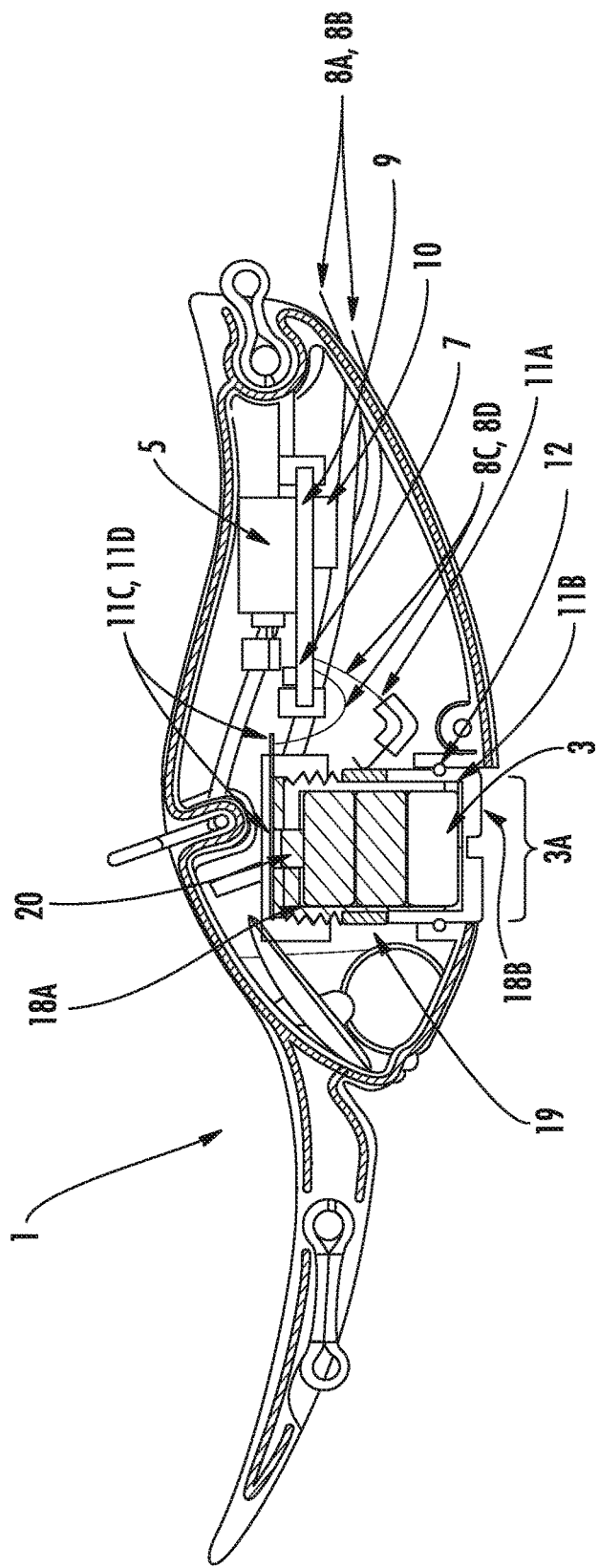
FIG. 3 presents a component level diagram of various devices used to effect a second embodiment of the Twitch Dynamic Fishing Lure having a removable battery pack and externally protruding open circuit.

FIG. 3 presents a component level diagram of various devices used to effect a second embodiment of the Twitch Dynamic Fishing Lure having a removable battery pack and externally protruding open circuit. One half shell of a fishing lure 1 is described and the corresponding half shell is not shown for simplicity but it is understood. In this implementation, a circuit board 9 is mounted in two U shaped plastic protrusions that are integrally formed from plastic with the inner surface of the half shell; further, these U shaped protrusions are disposed opposite one another with the open center of the U shape facing one another thereby permitting a user to slide the circuit board in the protrusions. An electric vibration motor 5 and an LED light 7 are attached by soldering to the top surface of the circuit board 6 forming appropriate electric contacts thereon. A micro-controller, glue logic or an IC controller 10 is soldered to the bottom surface of the circuit board 6 forming appropriate electric contacts thereon. It should be understood that the circuit board can alternatively be replaced with wiring only.

Next, two conductive wires 8A, 8B are wired separately to the circuit board forming contact points thereon; the other extreme portion of the wires 8A, 8B extend outwards to the inner surface of the half shell forming the fishing lure 1 and through two small perforations in its wall and proceed on beyond the outside of the half shell of fishing lure 1; alternatively, the second wire 8B proceeds out the other half shell through a hole therein although not shown. The use of nylon in the plastic inner lining of the holes, a rubber gasket or glue helps prevent leakage of liquids from the outside to inner portion of the lure.

Next, a battery changing device 3A formed from cylindrical ends 18A, 18B batteries 3, and an O-ring is provided on the bottom portion of the shell disposed within a circular passageway formed integrally from the body of the shell. The O-ring is attached by adhesives or physical pressure into a circular depression running along the inner space of the passageway; it is meant to engage a similar depression on the cylindrical end 18B having the screw driver slot. It should be understood that this battery changing device 3A is in conformity with that described in FIG. 7 below; in particular, the user inserts a screw driver into a slot in the cylinder 18B and turns its head until it disengages from the bottom of the fishing lure. At this point a user can extract the batteries 3 therein and replace them with fresh ones; closing of the device by reattaching the cylinder 18B completes the process.

Providing electric power from the batteries 3 to the rest of the components is accomplished by a wired circuit that communicates current thereto; activation of this circuit is accomplished by a user placing the lure in an aquatic or liquid environment thereby providing a conductive channel for electric current to flow between the conductive wires 8A, 8B. Thus, when conductive wires 8A, 8B are in the water current can flow there between activating the motion of the Twitch Fishing Lure as well as an optional LED light; of course, no electric power flows when the device is not in the water as their is no conductive pathway to transfer current therethrough. Thus, an angler has a unique mechanism by which he or she can simply toss the Twitch Lure into the water immediately activating the visual and motion capabilities therein.

Conductive wires 8A, 8B each have an end that extends out through a perforation or hole in the side of shell in the lure 1 and another end that is welded to separate contact points on circuit board 9; alternatively, 8B extends out through the other shell. Then another wire 8C is soldered to the contact for 8A on the board 9 and its opposite end to a linear metal contact 11C that is inserted in a hole in a U shaped mounting platform internal and integral to the half shells; this U platform grips the top cylinder 18A using threads within the platform that match threads external to the cylinder 18A. A hole 11D in the cylinder 18A permits the metal contact 20 to extend out therefrom and meet the linear metal contact 11C terminal thereby connecting to the batteries therein.

The contact on the board 9 for wire 8B is connected to another wire soldered to a terminal of motor 5; the other terminal of the motor 5 is soldered to one terminal of an optional LED device itself soldered onto the circuit board 9 creating a contact point thereon. The other terminal of the LED device is soldered to circuit board 9 creating another contact point that has a wire 8D soldered thereto leading back to the metal ring 19 found in FIG. 7; an intermediate connection is made through an L shaped conductive metal 11A soldered to wire 8D that impacts the external surface of a conductive metal ring 19. This conductive metal ring 19 has electrical contact with the internal L shaped contact 11B that finally meets the other terminal of the batteries arrayed inside of the device 3A.

Finally, the activation of the motion of the ERM is engaged by at least two wires 8A, 8B that extend out of the shell(s) of the lure 1 or through the use of the metallic fishing hook holders in an alternative embodiment. In other words, the figure eight (8) shaped metal pieces (fishing hook holders) that extend out from the body of the lure and that are waterproof sealed are also used together as an alternative to the wire solution. Thus, one can have a solution with the two wires extending out from the shell(s) and another solution with the wires 8A, 8B instead of leaving the shell are connected to FIG. 8 holders connected in a open circuit configuration for water activation; the figure eight holders have round connection for the hooks integral with their bodies.

FIG. 4 presents a component level diagram of various devices used to effect a third embodiment of the Twitch Dynamic Fishing Lure having a charging port. In this embodiment, a Twitch Fishing Lure is shown having a recharging system such that the internal lithium rechargeable battery can be re-energized via an external source such as a cellphone stick device, a cellphone charger, a transformer device, a USB wire to a computer port or similar device such as those in FIG. 6A, 6B.

One half shell of a fishing lure 1 is described and its corresponding half shell is not shown for simplicity but it is understood. In this implementation, a circuit board 9 is mounted in two U shaped plastic protrusions that are integrally formed from plastic with the inner surface of the half shell; further, these protrusions are disposed opposite one another with the open center of the U shape facing one another thereby permitting a user to slide the circuit board in the protrusions. An electric vibration motor 5 and an LED light 7 are attached by soldering (welded) to the top surface of the circuit board 9 forming appropriate electric contacts thereon. A micro-controller or IC controller 10 is soldered (welded) to the bottom surface of the circuit board 9 forming appropriate electric contacts thereon.

Next, two conductive wires 8E, 8F are wired separately to the circuit board forming contact points thereon; the other extreme portion of the wires 8E, 8F extend outwards to the inner surface of the half shell and through small perforations in its wall on beyond the outside of shell; alternatively, the wires extend one out of the first half shell and the other out of the second half shell. The use of nylon in the plastic inner lining of the perforation, rubber gaskets or glue helps prevent leakage of liquids from the outside to inner portion of the shells.

A charging port 12 is provided on the bottom portion of the shell formed integrally from the body of the shell of the fishing lure or from the two shells together. The port 12 is shaped in the drawing as a U shaped however this could mean a rectangular shape for a USB type connection or a cylindrical shape for a typical round charging plug connector; a metallic contact layer 12B is attached within the U shape mimicking its internal shape; this is accomplished using detents from the integral U shape or similar modalities that grip the edges thereof or the prearranged perforations in the metallic contact layer.

A small sliding or flip on off cover 12A is formed at the neck of the port 12; the cover has thumb push grooves on its external surface to one side thereof and a small arrowhead protrusion underneath the thumb grooves extending beyond the edge of the cover 12A; this small arrowhead protrusion engages a hole in the internal surface of the neck of the port 12. The other side of the cover has a small rectangular protrusion that fits snugly into a hole in the neck of the port 12. Thus, the port 12 is embedded in the shell underneath a waterproof cover 12A that opens up to reveal it. Alternatively, a mechanism found in various cell phone charging ports is used whereby a small flap is attached to the outside of the phone.

The powering of the Rechargeable Twitch Lure is to now described with respect to the following. Providing electric power from the Lithium Battery 14 to the rest of the components is accomplished by a wired circuit that communicates current thereto; activation of this circuit is accomplished by a user placing the lure in an aquatic or liquid environment thereby providing a conductive channel for electric current to flow between the conductive wires 8E, 8F. Thus, when conductive wires 8E, 8F are in the water current can flow there between activating the motion of the Twitch Fishing Lure as well as an optional LED light; of course, no electric power flows when the device is not in the water as their is no conductive pathway to transfer current therethrough. Thus, an angler has a unique mechanism by which he or she can simply toss the Twitch Lure into the water immediately activating the visual and motion capabilities therein.

A conductive wire 8E has one end that extends out through a perforation or hole in the side of shell and another end that is welded to a contact on circuit board 9; then another wire 8G is soldered to that contact point and its opposite end to a terminal of the lithium battery 14. A second conductive wire 8F has one end that extends out through a perforation or hole in the side of shell and another end that is soldered to a contact point on circuit board 9; then another wire is soldered to that same contact on the board and its opposite end to a terminal of the motor 5; the other terminal of the motor 5 is soldered using another wire to an optional LED device terminal that has both of its terminals soldered onto the circuit board 9.

The other terminal of the LED device is soldered to circuit board 9 creating another contact point; this contact point has a wire 8H soldered thereto leading back to the other terminal of lithium battery 14. It should be understood that two wires 14A, 14B each connect to one terminal of the lithium battery and each likewise connect to one of the two terminals of port 12 thereby providing charging power to the rechargeable lithium battery there through. A first wire 14A is connected to the U shaped inner metallic contact layer 12B whilst a second wire 14B is connected to a central pin or connector 13 that is held within a hole in the top portion of the metal contact layer 12B and the integral U molded shape holding it; of course, there is no direct contact between metal contact layer 12B and the central pin or connector 13 as the two are protected by a plastic protrusion (the inner small shape adjacent the connector 13) of the integral U shape; alternatively, detents and perforations can be used with a I shaped plastic insert that separates them (connector/contact layer) electrically.

As an alternative to the above implementation a wire having a suitable port connector on one side and two alligator clips on the ends thereof provide power to a fishing lure having two external metal protrusions connecting to an internal power source. Another implementation envisions using suitable sockets for USB, Micro USB, Mini USB, charger port, transformer ports and similar such devices having contacts/wires to effect an electrical contact. These would continue on to the inside of the fish lure and make contact with the circuit in FIG. 4 about the battery as typical recharging would require.

FIG. 5 presents a component level diagram of various devices used to effect a fourth embodiment of the Twitch Dynamic Fishing Lure having a non-removable battery pack and externally protruding open circuit. In this embodiment a plastic or polymer fishing lure 1 made from two external shells has embedded within it another dual shell container 3B that is completely enclosed at manufacture using a tongue/groove, protrusion/hole locking mechanisms and or glue. Within it are a set of disk shaped batteries 3 disposed posterior of a longitudinally arrayed circuit board 9 mounted within appropriately shaped walls therein (not shown for simplicity). Both the circuit board 9 and the batteries 3 have plastic spacers integrally formed from the interior surfaces of the dual shell container 3B so as to prevent them from disengaging therein.

An electric vibration motor 5 and an LED light 7 are attached by welding/soldering to the top surface of the circuit board 9 connecting their terminals as electric contacts to the board 9 and as described below. A micro-controller such as an IC controller 10 is welded/soldered to the bottom surface of the circuit board 9 forming appropriate electric contacts thereon. Next, two conductive wires 8I, 8J are connected separately to the bottom of circuit board 9 forming two contact points thereon; the other extreme portion of the wires 8I, 8J extend outwards and on through the enclosed shells 3B and into the external shells making up the lure 1 and beyond.

These proceed on through two small perforations in the enclosed internal shells 3B (one perforation each) and through two other small perforations in the external shells making up the fishing lure 1 and beyond the surface thereof. The use of nylon, rubber gasket(s) or glue helps prevent leakage of liquids from the outside to the inner portion of the fishing lure 1 or even on into the enclosed internal shells 3B at the location of these perforations.

The battery pack 3 in the shell 3B has a terminal connected by a conductor to the underside of the board 9 forming a contact point thereon; this contact point is further soldered to a wire on the board that connects to the contact point of one of the conductive wires 8I, 8J located on the bottom portion of the board. The other terminal of the battery pack 3 has a conductive wire that is soldered to the board 9 forming a contact point. This contact point is further wired (or soldered) to one terminal of an optional LED 7 (directly to motor 5 otherwise), also soldered to the board 9, whilst the other terminal of the LED 7 has its other terminal on the board connected by wire (or soldered) to a terminal of the vibration motor 5.

Next, the other terminal of the vibration motor 5 is connected to a conductive wire either 8J, 8I contact that has been soldered to the bottom of the surface of the circuit board 9. It should be understood that the vibration motor 5 and the LED 7 can be interchanged in the circuit and that the LED 7 is an optional feature. Finally, micro-controller, IC controller 10 is either series or parallel connected between the LED 7 and the vibration motor 5 or across the vibration motor 5. Thus, a user has the option of a water activated Twitch Fishing Lure that is portable and attracts a great deal of attention as the motion of the body effectively simulates a fish.

Figure 6A:
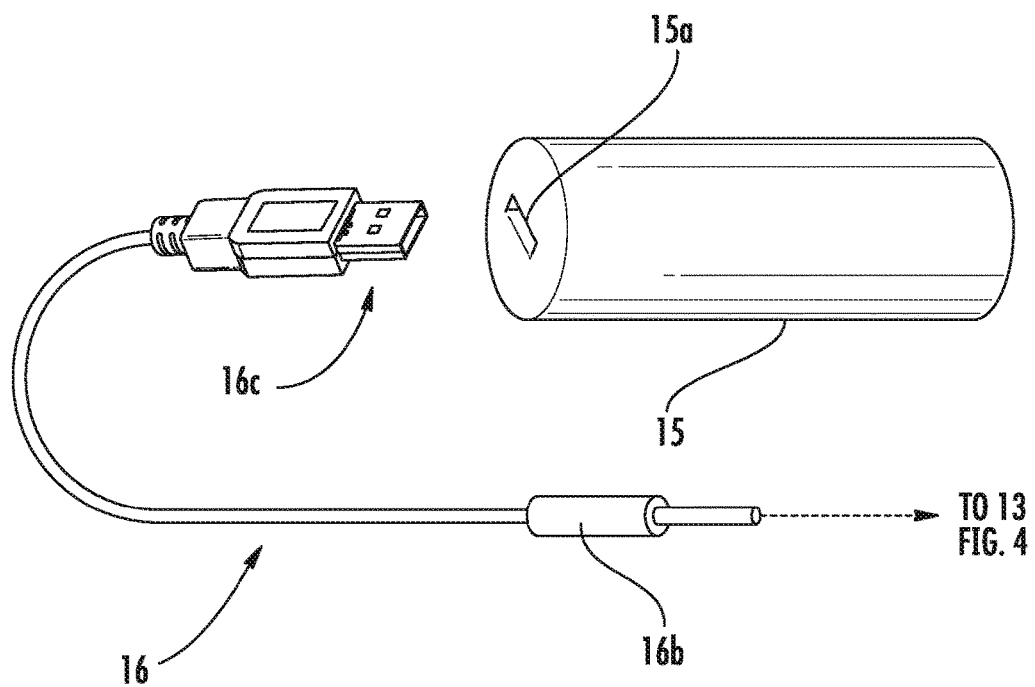
FIG. 6A presents an elevation view of a charging stick having a charging wire associated therewith.

FIG. 6A presents an elevation view of a charging stick having a charging wire associated therewith. A charging stick 15 is shown having a longitudinal body and a socket 15A for the insertion of a power adapter (USB, micro USB, mini USB) cable 16 having a first adapter 16C and another adapter shown as a round circuit adapter 16B integral therewith. These are useable to charge the Twitch Fishing lure in the embodiment of FIG. 4.

Figure 6B:
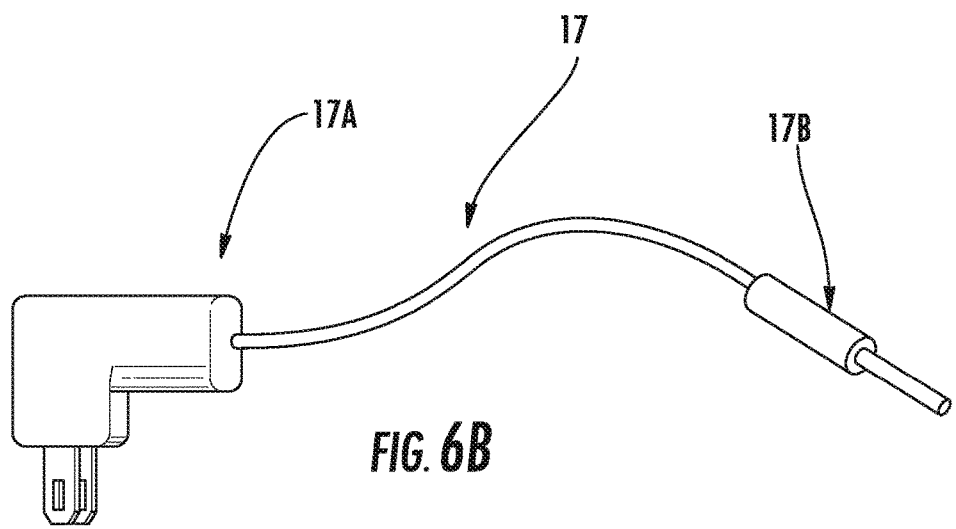
FIG. 6B presents an elevation view of a charger device having a charging wire associated therewith.

FIG. 6B presents an elevation view of a charger device having a charging wire associated therewith. A wire 17 has one end with a power adapter 17A or charger and the other end having a round adapter 17B. These are useable to charge the Twitch Fishing lure in the embodiment of FIG. 4.

Figure 7:
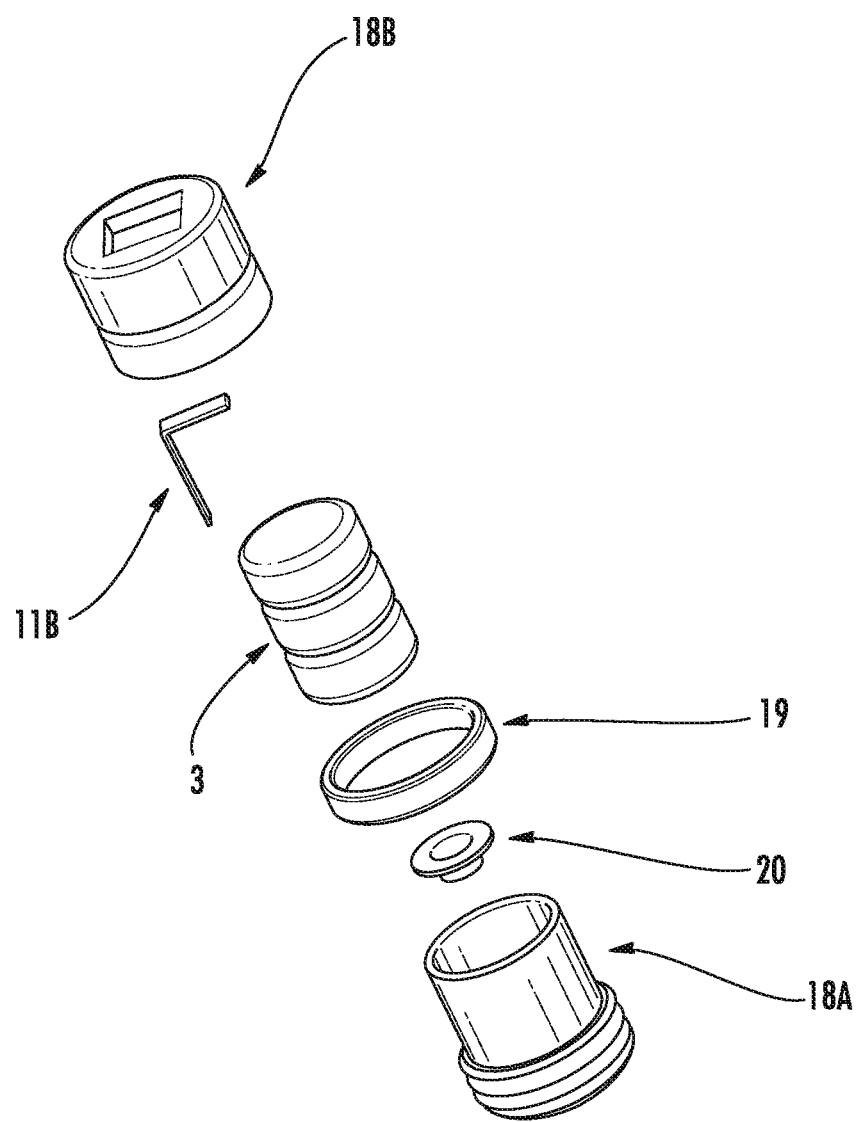
FIG. 7 presents various components describing a removable battery pack in the second embodiment of FIG. 3.

FIG. 7 presents various components describing a removable battery pack in the second embodiment of FIG. 3; this view shows an isometric complete battery compartment assembly in an embodiment. There are essentially six components to make a completely operable battery compartment as taught herein; these are namely, a cylindrical end 18B having a flat head screw depression and a circular O ring depression about its external surface, a L shaped metal contact 11B, a set of three batteries 3, a metal external spacer ring 19, a round metal contact 20 having an integral flanged bottom portion, a plastic cylindrical end 18A having an external thread and circular hole for the round metal contact 20.

The entire device sits within a circular mount that is formed from the interior walls of both fish shells; that is it is formed half in one fish shell and half in the other fish shell; this half circular shape mount has matching threads for the thread found on the plastic cylindrical end 18A thereby ensuring that it does not disengage therefrom (shown in FIG. 3 more appropriately). Alternatively, it is formed transverse between the two fish shells and exits out one of them; this for the removable of the batteries using a flat head screw driver to remove 18B.

Power is provided through the negative portion of the batteries 3 that is in contact with a leg of the L shaped metal contact 11B; the other leg of 11B is in contact with the metal spacer ring 19. At this point wiring is provided that makes contact with other parts of the circuit as described in FIG. 3. Power is provided via the positive portion of the batteries 3 in physical contact with and through a round metal contact 20 that sticks through a hole in the plastic cylindrical end 18A. This round metal contact has a flange that prevents it from exiting through this hole in the plastic cylindrical end 18A.

Further Consideration:

Any of the herein embodiments having an open circuit water activation feature using externally extending wires can optionally have the following alternative implementation. A figure eight (8) metal contact sits within the fishing lure and the other half sits outside of it for attachment of fishing hooks thereto (negative or positive wired connection to appropriate battery terminals or vice versa). The figure eight contacts are inserted within the shell of the fishing lure in a mounting region integrally formed from the internal space of the external shell(s) provided in one or both fishing shells to ensure that this structure does not move therein. The mounting regions described herein closely match the shapes therein and can be optionally sealed by rubber gaskets, adhesives or nylon seals as appropriate. In this fashion when a user throws the fishing lure in the water, electrical power is delivered via the two open circuit ends and through the water itself thereby activating the ERM motor and optionally any lights or other onboard devices.

Further the controller or IC control device taught in any embodiment herein is a typical Eccentric Rotating Mass controller or a custom designed one specific to the needs of the implementation. This may be substituted with a dedicated micro-controller, glue logic, circuit elements or combinations of the foregoing as appropriate. They can be in parallel or series to the ERM motor for control thereof.

It should be understood that various modifications of the teachings herein are contemplated and possible and that would still be within the breadth and scope of the appended claims. For example, a eccentric rotating mass motor is utilized as a primary vibrational motivator, however, any of the various other types of motors currently available can be utilized to perform the same effect and this would still be within the scope of the accompanying claims.

Figure 8:
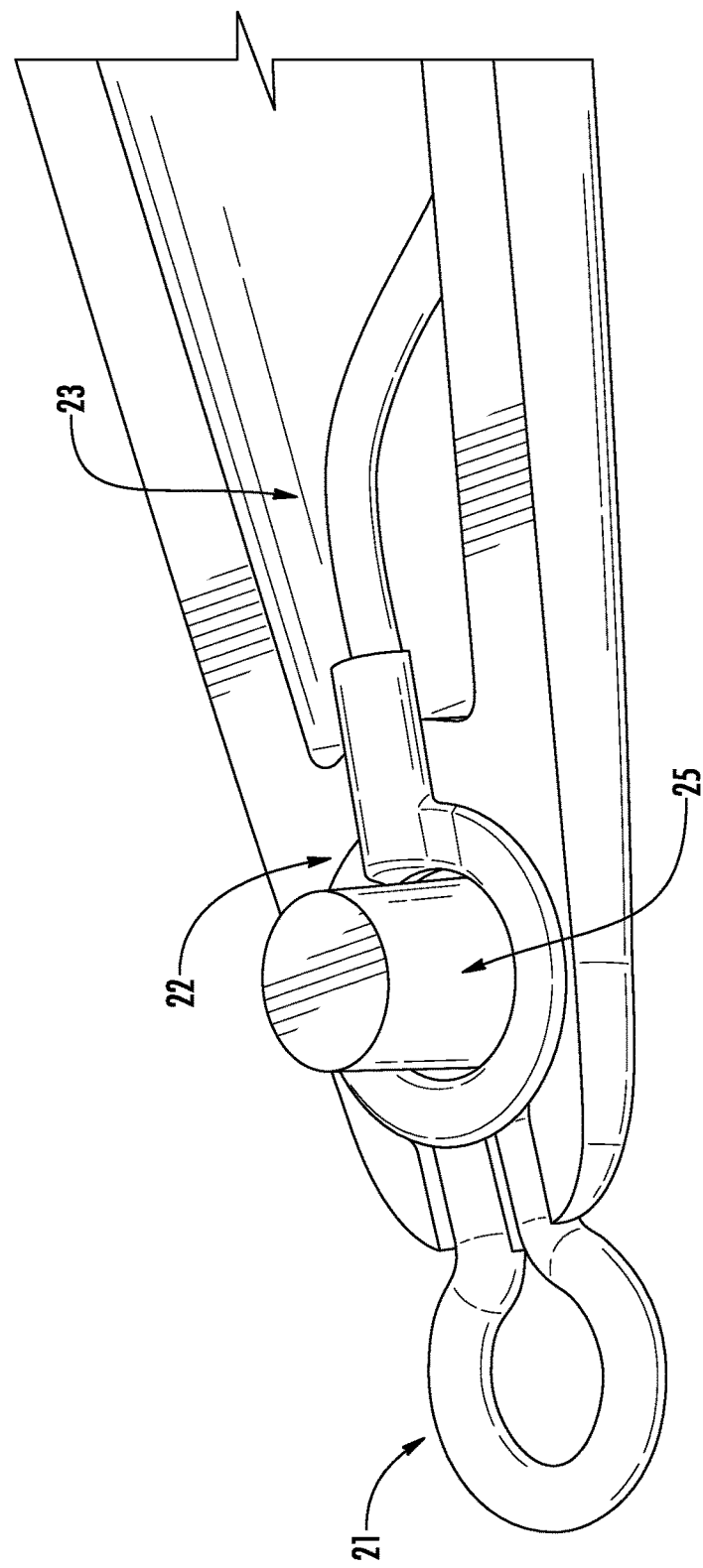
FIG. 8 presents a closeup view of a Twitch Disk electrical Contact device that makes contact with a figure eight fishing hook holder in an embodiment.

FIG. 8 presents a closeup view of a Twitch Disk electrical Contact device that makes contact with a figure eight fishing hook holder in an embodiment. A figure eight fishing hook holder 21 is placed within a suitable depression formed from an inner surface of the shell of the fishing lure such that one end 'circle' of the fishing hook holder 21 is centered on a raised round protrusion 25 integral with a shell of the lure device; the neck of the FIG. 8 fishing hook holder 21 sits within a similar depression whose surface is integral with the previous depression surface.

Thus, the neck or intermediate portion between the two circle portions making up the FIG. 8 fishing hook holders 21 sits in a depression that opens up to the outside so that the other end of the fishing hook holder 21 is exposed to the elements; as a result, a fishing hook can easily be attached thereto. The raised protrusion 25 matches a corresponding depression (not shown) on the other shell of the fishing lure so as to effect a tight engagement therewith. An electrical wire 23 attached to a portion of the circuit that is intended to have a contact to an open circuit nodal point is soldered to an electrically conductive disk shaped device 22 at its integral neck portion. This disk shaped device 22 is also centered about protrusion 25 and sits atop the fishing hook holder 21 so as to make physical contact therewith and permit electrical current to flow there between.

Figure 9:
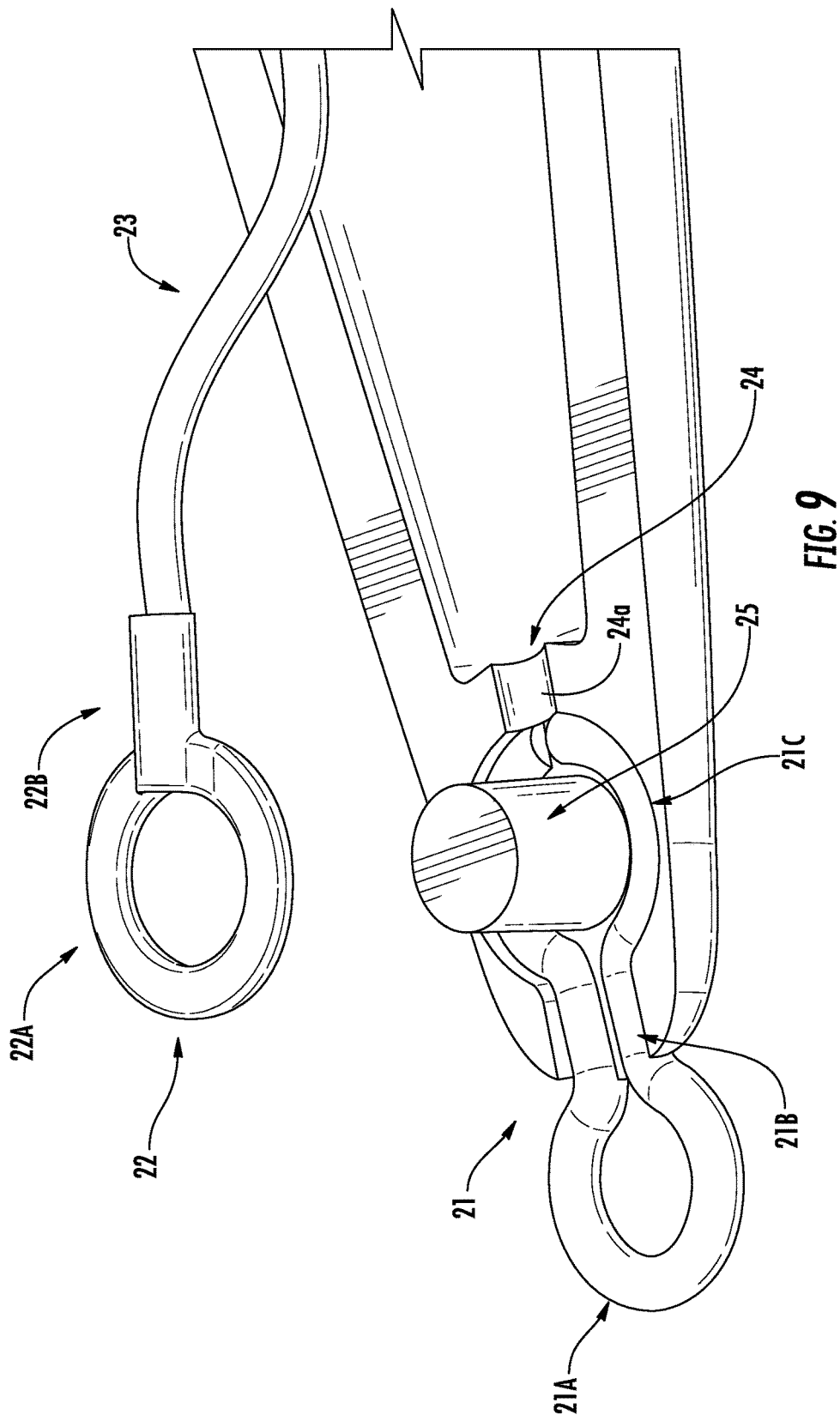
FIG. 9 presents a closeup view of a Twitch Disk electrical Contact device separate from the figure eight fishing hook holder that it is designed to make contact with in an embodiment.

FIG. 9 presents a closeup view of a Twitch Disk electrical Contact device separate from the figure eight fishing hook holder that it is designed to make contact with in an embodiment. This view more clearly shows how the fishing hook holder 21 is integrally made from a single conductive metal in the shape of a FIG. 8; thus, a first 'circular' portion 21A of the FIG. 8 protruding outside of the fishing lure is connected at each circular end thereof to one of two intermediate portions 21B that each further integrates with one of the other 'circular' portion 21C ends such that the circular portion 21C is itself concentrically located about raised protrusion 25 and is buried within a suitable depression in the body of the fishing lure. It should be understood that the intermediate portions 21B is located within a depression in the fishing lure shell so as to forbid rotation (as much as possible) of the fishing hook about the raised protrusion 25. Further, the FIG. 8 fishing hook holder 21 can be a complete loop or can be broken at a point (see the break in 21C) thereof simply to facilitate simpler manufacturing.

Next, a curved wall 24 extends from one inner molded wall of the fishing lure shell to another inner molded wall. Thus, this curved wall 24 within the fishing lure forms a head buttress for the circle portion 21C that is concentrically located about raised protrusion 25. Additionally, if desired in the implementation, this curved wall has a notch or cutout 24A (not shown) for the neck portion 22B of the disk shaped device 22 so that it can appropriately sit therein.

Finally, an electrical wire 23 attached to a portion of the circuit that is intended to have a contact to an externally protruding open circuit nodal point is soldered to a disk shaped device 22 at its integral neck portion 22B that is a round or cylindrically hollow shape permitting internal attachment thereto. This disk shaped device portion 22A sits atop the fishing hook holder 21 at its interiorly disposed circle portion 21C such that both (22A, 21C) of the aforementioned are concentrically located on raised protrusion 25. Whether using a notch 24A or not in one half shell of the fishing lure, it should be understood that the other shell is shaped in such a fashion so as to enclose the top portions of the aforementioned holder 21 and dish shaped device 22 therein and to sit flush with the first shell so as to create a complete streamlined fishing lure.

At this point, the entire fishing lure is then ultrasonically sealed whereby acoustic vibrations are applied to the two shells to seal them together and to effect a water tight seal at the hole in one or both shells at the neck 21B between the two shells so that molded plastic of the shells covers the part. This entire system and process helps in maintaining the lure as the fishing hook 21 is moved violently around by a captured fish causing a an attempted rotational motion about protrusion 25. Any further seepage within the device is reduced or even eliminated by having the disk device 22 in tight contact with the holder 21.

Figure 10:
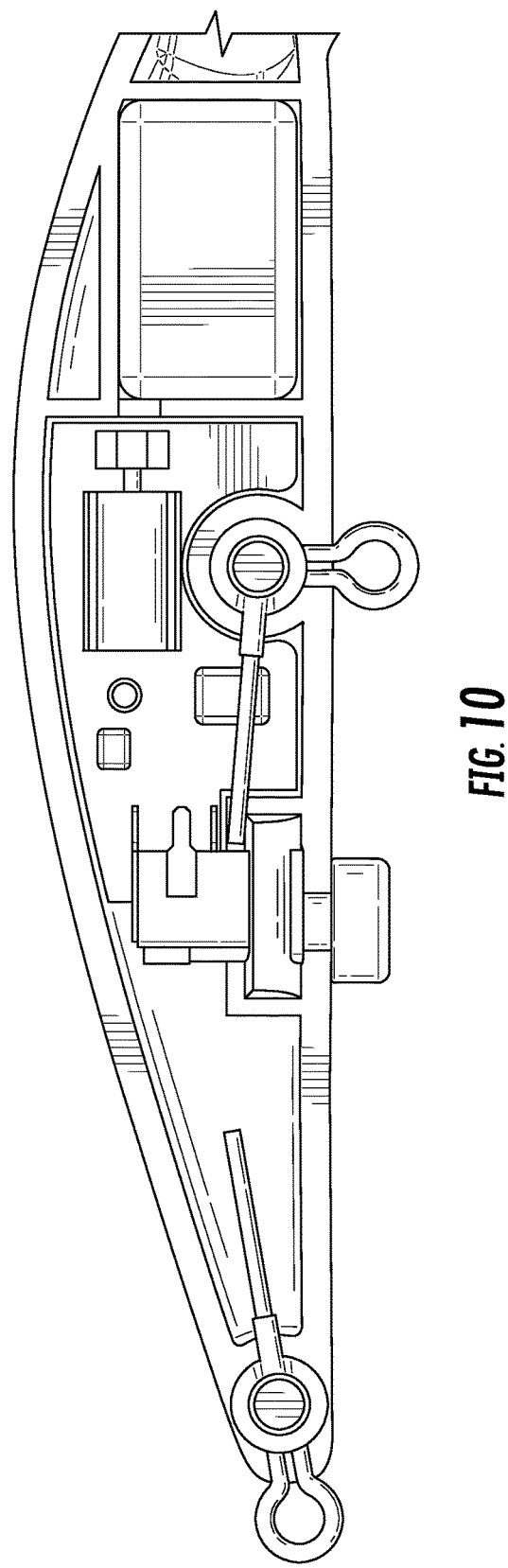
FIG. 10 presents an elevation view of a Twitch Disk electrical Contact device in a mid body position and in an end (or forward) position making contact with their respective figure eight fishing hook holders in an embodiment.

FIG. 10 presents an elevation view of a Twitch Disk electrical Contact device in a mid body position and in an end (or forward) position making contact with their respective figure eight fishing hook holders in an embodiment. Two open circuit contact positions are shown. Other locations are possible throughout the lure.

Figure 11:
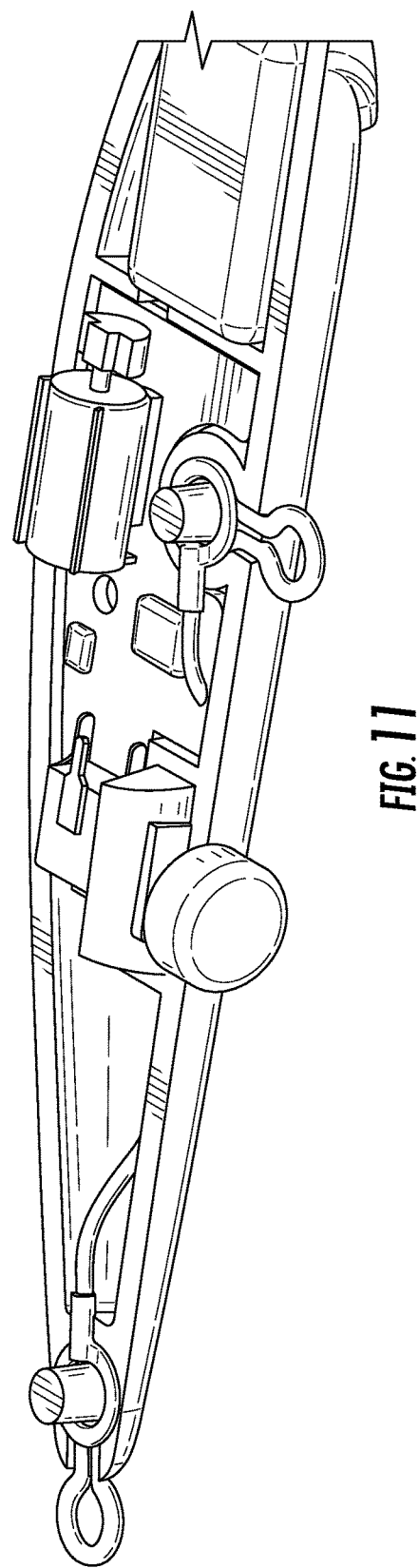
FIG. 11 presents a perspective view of a Twitch Disk electrical Contact device in a mid body position and in an end (or forward) position making contact with their respective figure eight fishing hook holders in an embodiment.

FIG. 11 presents a perspective view of a Twitch Disk electrical Contact device in a mid body position and in an end (or forward) position making contact with their respective figure eight fishing hook holders in an embodiment. Two open circuit contact positions are shown. Other locations are possible throughout the lure.

Operational Description in an Embodiment

Figure 12:
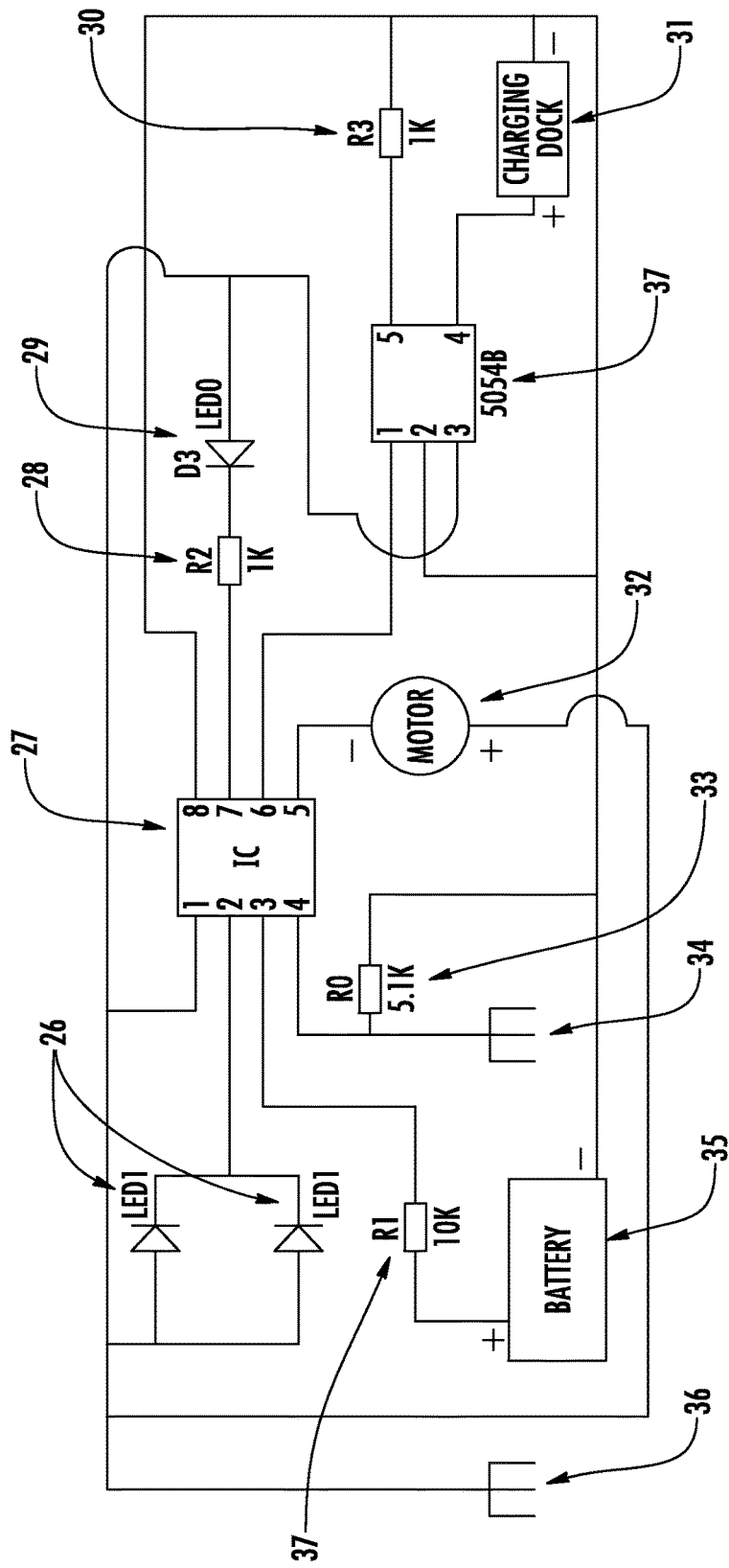
FIG. 12 presents an electrical diagram in an alternative embodiment of a Twitch device describing various lighting and vibrational properties.

FIG. 12 presents an electrical diagram in an alternative embodiment of a Twitch System describing various lighting and vibrational properties. Most broadly, a battery powered system is provided having an attached lighting and vibrational motor luring system for attracting the fish during water activation thereof. Also, integrated into the system is another lighting signaling and charging system of the device. This lighting and charging system uses a charging port prepared for selective user connection of a charging wire thereto. In this example, the charging wire has an end with a centrally embedded terminal in a round charging cylinder connector (barrel or cylinder type) and the other end of the charging wire has a USB connector; together, these form a single charging wire so you can connect the rechargeable fishing lure to a computer port or similar USB port.

First, a fishing lure is placed in the water permitting current flow between two open circuit terminals that are each separately in electrical communication with a fishing hook holder (having a hook attached thereto) in the fishing lure and with separate points in the circuit of FIG. 12. As a result, an IC controller manages the vibrational properties of an attached vibrational motor alternating the activation-deactivation thereof according to a predetermined programmed protocol of timed events. Additionally, LED lights attached to the IC controller are pulsed accordingly in synchronicity with the activation-deactivation of the attached vibrational motor thereby providing a highly attractive luring effect.

Next, when the fishing lure is removed from the water, the activation-deactivation of the vibrational and lure lighting system is disabled since current can not flow between the two open circuit terminals each in contact with an externally protruding hook holder. If a user wants to recharge the device, then the connection of a round barrel or cylinder connector (integral with a wire and USB connector) to a charging dock integrated into the body of the fishing lure is required. Once connected a charging lighting device is activated which is on whilst charging and shuts off once the device is fully charged. A counter included in the system of FIG. 12 counts the number of charges that are permitted with the device until the device has reached its useful limit; it is currently believed that the system has a useful life of ten charges although the specific device can have fewer or more depending on the stress level imposed on a particular unit by a user. The following description more fully describes the specific elements that enable the device.

FIG. 12 has a Twitch electronic system in an embodiment having two main components, namely, IC controller 27 (such as JZL122614CM) having 8 pins connected on a board together with various components as well as to auxiliary recharging IC device 37 (such as 5054B) and it 5 pins as follows. It should be understood that these two identification numbers are given as exemplary only and that any two general purpose controller and auxiliary controller can be used in the description that follows. The terminals 34, 36 serve as the open circuit terminals that are in physical contact with the FIG. 8 fishing hook holder devices that protrude from the fishing lure and activate the luring system motor, and LED1s when in contact with water.

The first open circuit terminal 36 is wired in to pin 1 of the IC controller, to identical terminals of two parallel LEDs (LED1, 26), to pin 3 of auxiliary IC 37, to one end of LED0 (D3) as well as to the positive terminal of a vibration motor 32. The other terminals of the two LEDs (LED1) 26 are wired together and to pin 2 of IC controller 27. The negative terminal of motor 32 is connected to pin 5 of IC controller 27. When there is no charging cylinder connected on dock 31 and when water activation is enabled across terminals 34, 36 pins 4, 1 communicated this water enablement through programmed switches within IC controller 27 and to pin 2 that controls the activation and deactivation of LED1s 26 utilizing a predetermined timing sequence of ON and OFF periods cycling at varying time intervals along with activation of the motor 32 utilizing switches internal of IC 27 that output the correct sequence on pin 5 thereof Thus, an exemplary sequence includes 1 s ON, 1 s OFF, 1.5 s ON, 1.5 s OFF, 2 s ON, 2 s OFF, 2.5 s ON and 2.5 s OFF then repeating from the start. It should be understood that the particular length of time in either the ON and or OFF cycle can vary according to the implementation. Similarly, the cycle does not have to steadily increment; rather, the sequence is optionally decrementing or even with variable times for each ON and OFF cycle.

Pin 3 of IC controller 27 is connected to a terminal of resistor R1 (10k) that itself has another terminal connected to power source battery 35; the other terminal of battery 35 is connected to pin 8 of IC controller 27, to a terminal of Charging Dock 31, to pin 2 of auxiliary IC 37; to a resistor terminal R3 (1k) that has its other terminal as input to pin 5 of IC 37; and the other terminal of the battery is also connected to a terminal of resistor R0 (5.1k). This resistor R0 (5.1k) has its other terminal connected to pin 4 of IC controller 27 as well as to the other open circuit terminal 34. Thus, when the lure is thrown in the water, current flows through these two terminals 34, 36 so as to activate motor 32 and lights 26 LED1s on a preprogrammed periodic pulsed basis of ON, OFF, ON, OFF and so forth; a typical sequence such as 1 s ON, 1 s OFF, 2 s ON, 2 s OFF, 3 s ON, 3 s OFF and so forth is contemplated. The time periods do not have to be identical with the period off being more or less than the period on. Similarly, the cycle does not have to steadily increment; rather, the sequence is optionally decrementing or even with variable times for each ON and OFF cycle.

Pin 1 of auxiliary IC controller 37 is connected to pin 6 of IC controller 27. Pin 2 of IC 37 is connected to a terminal of the Charging Dock 31 that has its other terminal connected to pin 4 of IC 37. Pin 2 of IC 37 is connected also to R0 33 5.1k, to a terminal of battery 35, to Dock 31, to pin 8 of IC 27 and to a terminal of 30 R3 1k. This resistor 30 R3 1k is connected as described above to the battery 35, Dock 31, pin 2 IC 37, pin 8 of IC 27, R0 33 5.1k at one terminal and its other terminal is connected to pin 5 of IC 37. Pin 3 of auxiliary IC 37 is connected to a terminal of LED0 (D3) 29 that has its other terminal connected to a resistor R2 1k 28 having its other terminal connected to pin 7 of IC controller 27. Pin 3 of auxiliary IC 37 is also connected with the terminal of LED0 to pin 1 of IC 27 as well as the terminals of LED1, the motor 32, and the open circuit terminal 36.

When the charging dock 31 has a connector inserted therein, then the auxiliary chip 37 senses this fact and a charging light LED0 is turned on through pin 3 of IC 37 using internal switches therein. Once charging is complete, as sensed through internal voltage and or current detectors built therein, the chip 37 turns off the LED0 indicating that charging is complete. When not in the water no current flows between 34, 36 so that LED1s 26 are off and motor 32 is turned off; similarly when there is no charging connector connected at DOCK 31 the charging LED0 is OFF. Additionally, IC auxiliary controller 37 pin 3 controls the activation of LED0 by setting appropriate states to make it flash OFF and ON repeatedly for a predetermined number of times when the maximum recommended number X of charges has taken place (currently X=10) by an onboard counter in IC 5054b 37.

It (pin 3) also controls the steady state operation of LED0 for indicating charging when the current number X of charges is less than a maximum value by setting an appropriate state to make it be steady (1) and turns LED0 off with an appropriate reset state (0) thereon. Pin 1 of IC controller 37 communicates with pin 6 of IC controller 27 so as to ensure deactivation of the motor on pin 5 and the lights LED1s on pin 2 (using internal switches within 27 therein) whilst a charging connector cylinder is connected to the dock 31. If however, there is no cylinder charging connector attached to the dock 31 then these internal switches are left in a state that they can sense water activation on open circuit terminals 34, 36. It should be understood that the particular switches within 27, 37 on controlling and determining whether or not to charge, water activation-deactivation or quiescent state can be distributed to either controller 27 or auxiliary controller 37 or both. Further, the two are optionally integrated into a single component to perform the same functions along with appropriate glue logic. Finally, it should be understood that the broadest interpretation of 27, 37 are generic controller, auxiliary controller and should not be limited to the specific items numbers indicated above which are only exemplary.

Figure 13:
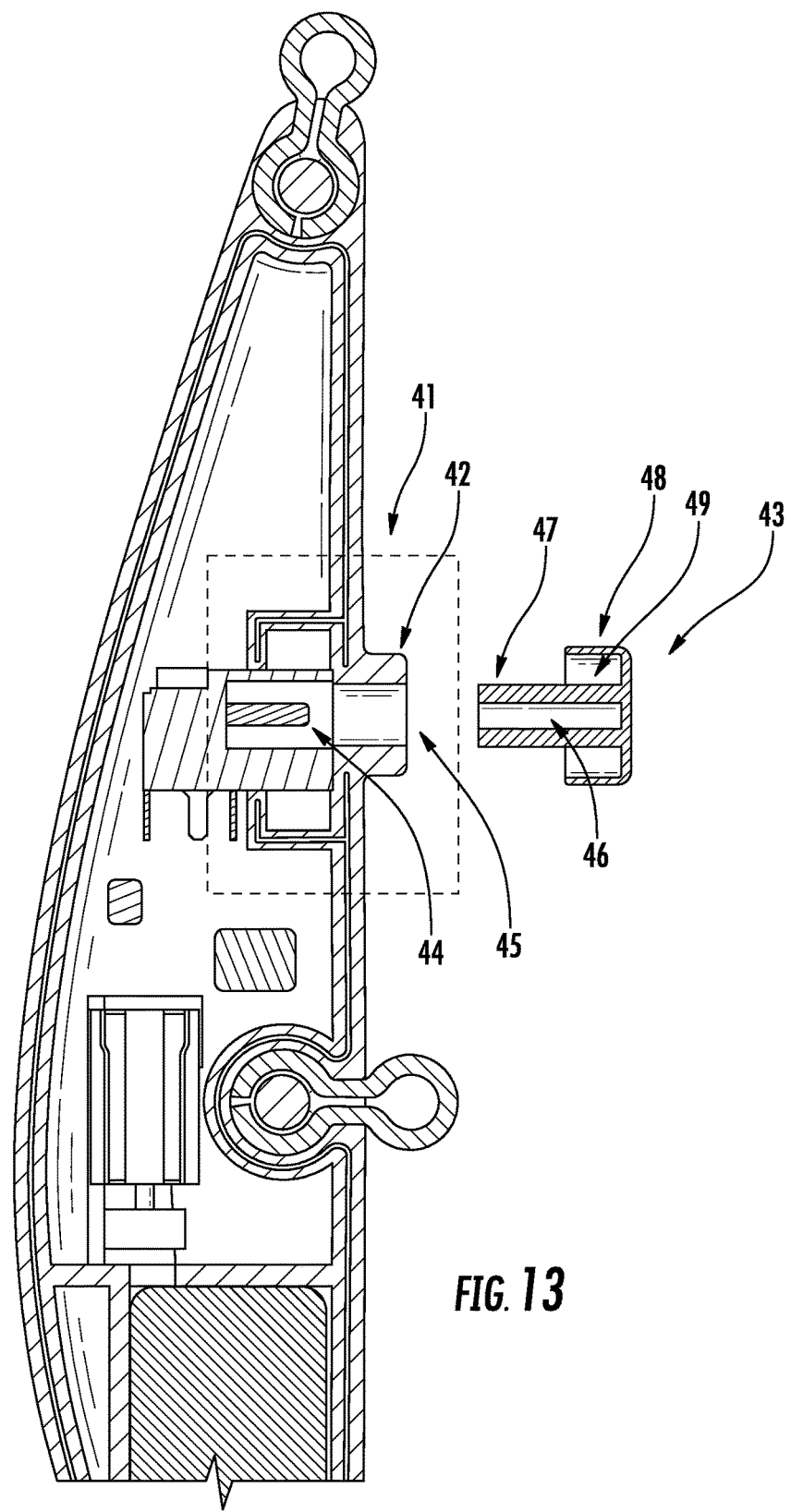
FIG. 13 presents a fishing device having an embedded control device and a recharging power port that is exposed to the elements as well as a sealing cap in an embodiment.

FIG. 13 presents a fishing device having an embedded control device, vibrational device and powering system and a recharging power port that is exposed to the elements as well as a sealing cap. The violent nature of a fish attached to a lure necessitated the improvement as taught herein. The recharging power port 41 shown to the left of the sealing cap 43 has its central power terminal and its conductive internal side walls terminal connected to other corresponding electronic terminals within the fishing device for vibrational powering thereof. An external plastic portion 42 of the power port protrudes out from and is integral with the body of a fishing device; the power port has a small power terminal 44 centrally disposed in the primary hollow channel 45 of the power port. The external plastic portion 42 is circular in this implementation; however, any suitable shape is envisioned and would depend upon the surface features of the proposed connection device.

It is understood that the power terminal 44 is attached to the plastic molded surroundings having a hole for this device to pass therethrough in such a way that it does not move therefrom; the use of one or more of the following: a pre-molded slot within which an integral base (square or circle base) of the power terminal 44 rod sits, undercuts, over-cuts, tongue and groove within the plastic molded parts, and more are optional alternatives for attachment of the terminal to the plastic surroundings. It should be understood that this power terminal 44 is electrically separate or 'insulated' from the electrically conductive cylindrical side walls that form all or a portion of the primary hollow channel 45 by suitable plastic material there between with the addition of a slot for the integral base (integrally attached to the terminal rod) formed in the plastic form of the shell. Thus, the conductive cylindrical side walls forms the other terminal for the port 41 and is designed to make contact with the corresponding external cylindrical side wall of an inserted barrel connector (having a USB connector attached thereto forming a single wire connector). This power terminal 44 is to be inserted within a corresponding centrally disposed terminal channel 46 of the sealing cap 43 when prepared for use.

The sealing cap 43 is made of silicone rubber, nylon or similar material. Encasing the void of the terminal channel 46 is cylinder 47 that itself is to be inserted into primary channel 45 of the power port 41. This primary channel 45 has walls partially or wholly made of conductive material that is molded into corresponding surroundings so as to seal the inner portion of the fishing lure from external water seepage whilst permitting the cylindrical sides of a barrel type connector to electrically engage thereto. If partially made of conductive material then the rest is made substantially from the material comprising the fishing lure structure. An inner surface of the conductive side wall material is electrically wired to an appropriate portion of the circuit shown in FIG. 12 through an appropriate hole in the plastic surroundings. Similarly, the terminal 44 is attached electrically to the circuit through the base bottom and or optionally through the surrounding plastic material.

The cylinder 47 has a closed end that integrates with the underside of a mushroom head 48 that extends down and about a portion of the external surface of the cylinder 47. This configuration leaves a circular space 49 about the cylinder 47 between the outer surface of the cylinder 47 and inner surface of that portion of the mushroom head 48 that extends down and thereabout a portion of the cylinder 47. Thus, it should be understood that a portion of the cylinder 47 is not covered by the mushroom head 48. The circular space 49 is formed so that it engages the outer circular surface of the external plastic portion 42 of the power port that protrudes out from and is integral with the body of a fishing device.

The diagram of FIG. 13 contemplates using a cylinder connector or barrel connector having a center mounted terminal buried within the cylinder and or on the fishing lure port itself. It should be apparent that there are numerous types of these connectors including some that do not have this center connection and there are also USB ports that can be mounted; thus, the seal needs to be adapted to these recharging systems. Thus, a process for creating an appropriate seal would be as follows, determining a type of charging port, analyzing the various internal and external surfaces thereof, analyzing the various surfaces of the connector, creating a seal that mirrors the design of the connector surfaces as they come into conjunction with the port and extending the seal so that it overflows about the external surface of the port, lure and internal workings of the port. Thus, this last step insures that there is a multiple level seal as appropriate to the port. For example, various USB devices have internal surfaces and raised protrusions that can be utilized to create a multi level seal appropriate thereto. A raised protrusion would be inserted in passage like 46 that surround with a encompassing surface such as 47 except now this would be generally rectangular or square as needed by the port and connection device type.

Figure 14:
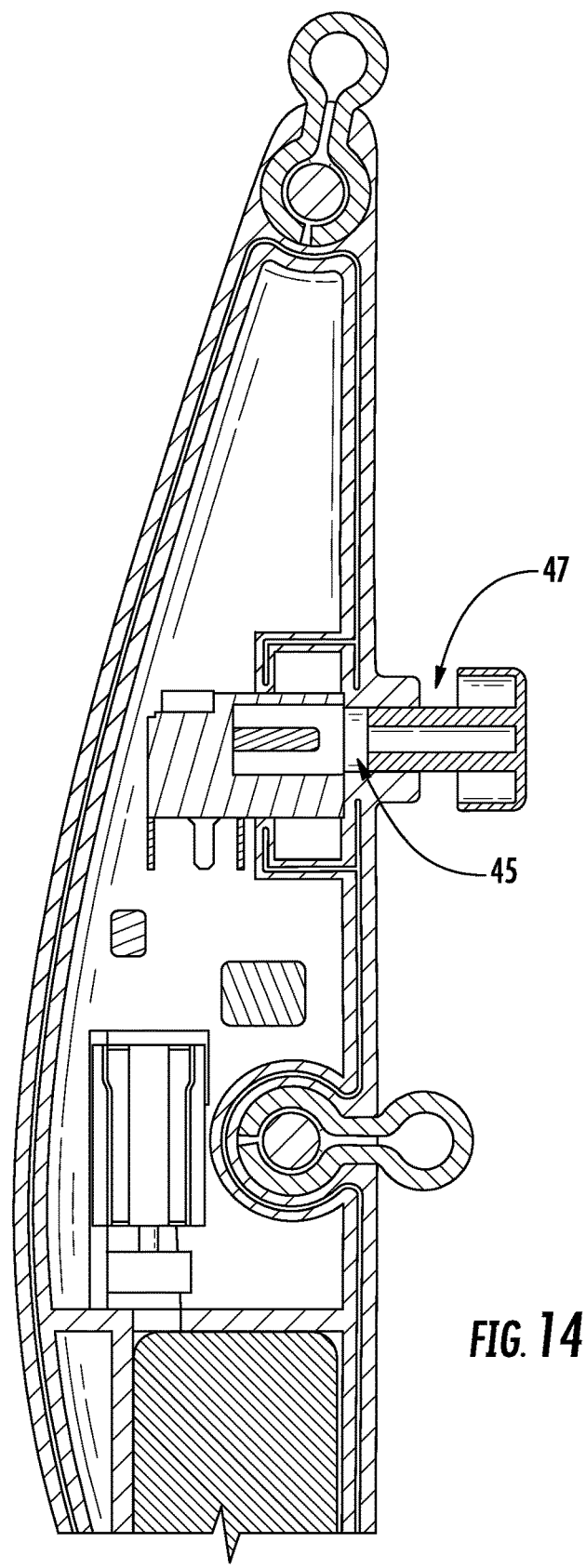
FIG. 14 presents a fishing device having an embedded control device and a recharging power port that is exposed to the elements as well as a sealing cap; in this view the sealing cap is inserted within the primary channel of the power port in an embodiment.

FIG. 14 presents a fishing device having an embedded control device and a recharging power port that is exposed to the elements as well as a sealing cap; in this view the sealing cap 43 is inserted within the primary channel of the power port 41. Here cylinder 47 is inserted into primary channel 45 of the power port 41.

Figure 15:
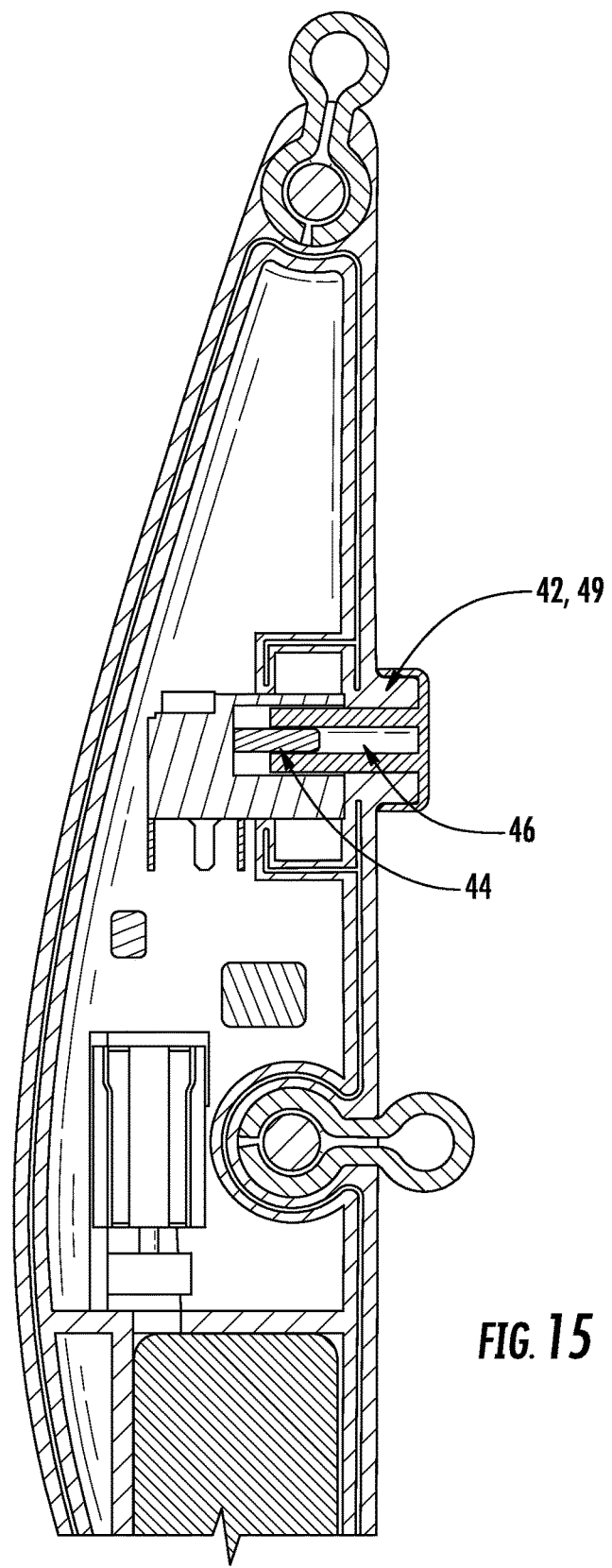
FIG. 15 presents a fishing device having an embedded control device and a recharging power port that is exposed to the elements as well as a sealing cap; in this view, the sealing cap is inserted within the primary channel of the power port and the power terminal is inserted within the terminal channel in the sealing cap in an embodiment.

FIG. 15 presents a fishing device having an embedded control device and a recharging power port that is exposed to the elements as well as a sealing cap; in this view, the sealing cap 43 cylinder 47 is inserted within the primary channel 45 of the power port 41 and the power terminal 44 is inserted within the terminal channel 46 in the sealing cap. Further, it is clear from the drawings that the circular space 49 is formed so that is engages the outer circular surface of the external plastic portion 42 of the power port 41 that protrudes out from and is integral with the body of a fishing device. It should be understood from FIG. 13-15 that the sealing cap 13 is attached to a power port 41 of a fishing lure having a raised protrusion 42. The raised protrusion and internal channel seal was necessary as this greatly improved the viability of the seal so that shock and vibration of the fish attached to a hook does not cause the sealing cap to eject from the port. These devices as described herein have two shells making a complete fishing lure; thus, a few optional alternatives are contemplated in that the charging port is present on one shell or connected at a juncture between the two shells.

Figure 16A:
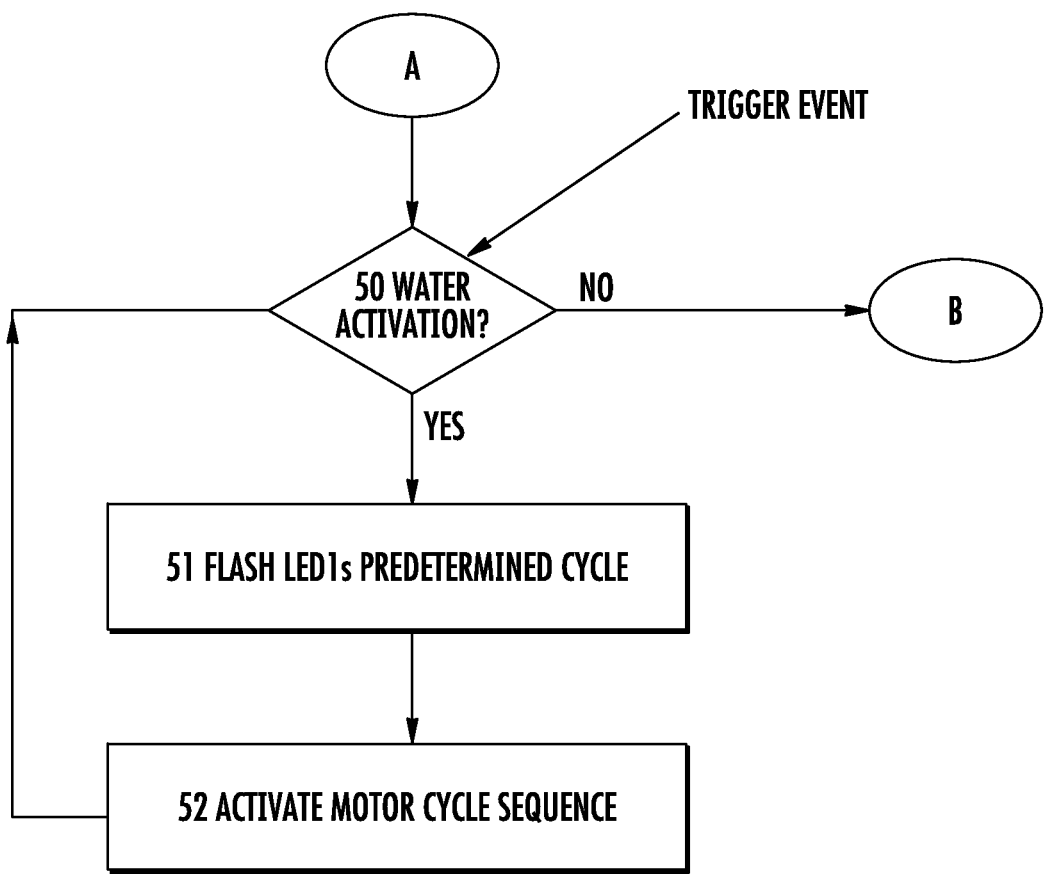
FIG. 16A presents a first part of a process describing the operational flow of the electrical circuit in FIG. 12.

FIG. 16A presents a first part of a process describing the operational flow of the electrical circuit in FIG. 12. The system is in a quiescent state waiting for a trigger event such as water activation or charging and upon receipt thereof executing certain actions that are incumbent on the mode of operation. If a water trigger event is detected 50 (Yes) by the open circuit terminal points 34, 36 permitting current flow into the circuit then the two LED1s 26 are flashed 51 according to a predetermined cycle of ON and OFF that are decremented, incremented or a pseudo random predetermined sequence according to user wishes. A vibrational motor is similarly activated 52 concurrently and cycled accordingly with the ON and OFF states of the LED1s 26; switches internal to IC 27 perform these activation deactivation routines along with optional software control stored on onboard memory. The process returns to waiting for the water trigger event or until water non-activation is detected. If water activation does not occur at 50 then the process in its quiescent state cycles onwards to B. The overall system process continues on FIG. 16B.

Figure 16B:
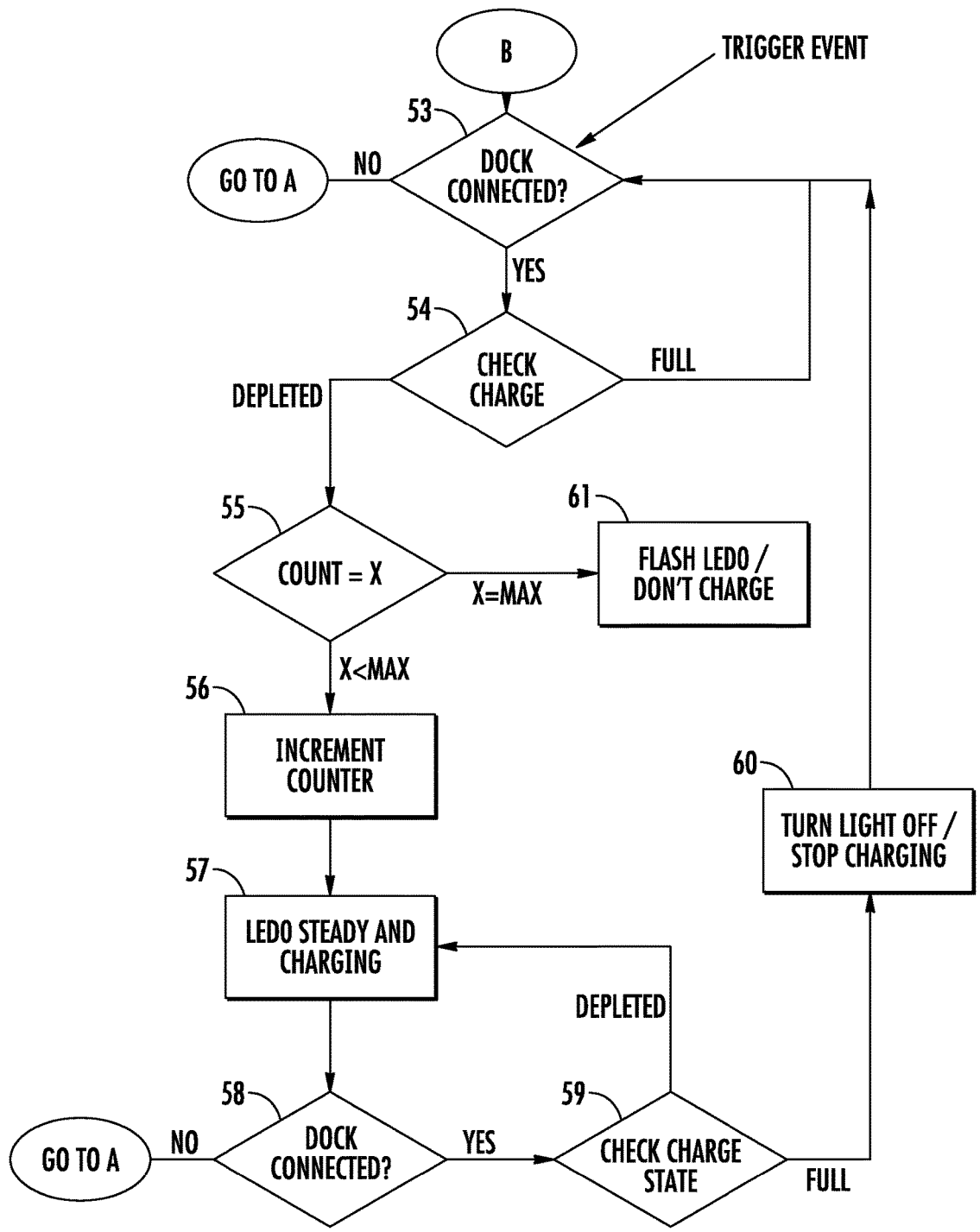
FIG. 16B presents a second part of a process describing the operational flow of the electrical circuit in FIG. 12.

FIG. 16B presents a second part of a process describing the operational flow of the electrical circuit in FIG. 12. If a charging connector wire is or is not connected 53 to DOCK 31 is determined by IC auxiliary 37 using voltage or current detection. If a charging connector is NOT connected then the system process returns to A on FIG. 16A. If a charging connector is connected in the DOCK 31 then the amount of charge is detected 54 by voltage and or current detection or similar circuitry. If full then the system reenters a quiescent state and waits for another trigger event. If the battery 35 is DEPLETED then a determination 55 is made of the value of an OnChip counter in IC auxiliary chip 37. If FULL (Count −MAX 10 charges for example) then the LED0 flashes On and OFF a predetermined number of times and no charging occurs as internal switches within controller 37 are disabled forbidding this so that process ends; alternatively, the process optionally returns to the waiting for trigger events returning to step 53 for example.

If the count is less then a maximum then the on-chip counter in auxiliary chip 37 is incremented 56. The battery 35 is charged and LED0 enters into a steady light mode of operation by auxiliary chip 37 enabling one or more internal switches to permit the aforementioned. Then a determination 58 is made as to whether the dock is still connected or not. If the connector is removed from the DOCK 31 then the process cycles to a quiescent state and this is indicated by going back to A. If however, the dock is still connected another check 59 is made as to the charge state of the battery 35; if depleted then the LED0 remains lit and charging continues. If the charge state is FULL then LED0 is turned off and charging stops by IC controller 37 disabling one or more switches that permit the light and charging so that the process returns to determining 53 whether or not the DOCK is connected.

It should be understood in the description of the above process that there are hardware, software and or firmware that have been preprogrammed into the controllers 27, 37 to effect the aforementioned process. For example, a timer included within 27 is used to control the timed events of the vibrational motor and LEDs for water activation luring attraction function along with software in an on-chip memory organizing and cycling all of these procedural steps. The software, timer, and other switches are optionally included in one, both or an integrated singular control device. Similarly, a counter, timer and detection circuitry is located within 37 for control of the dock. Any of these hardware, software or firmware is optionally rearranged in one, both or in an integral control device. Finally, the circuit resistance has been tuned to both fresh and salt water operation.

The following is a list of the operational states of IC controller 27 and auxiliary IC controller 37 in one embodiment delineating the pins and the functions thereof in an exemplary embodiment.

IC Controller 27—Pin # Primary Function
1 Electric circuit (+) & Touch wire (+) & Flashing LED 1 lights (−) & Motor (+)
2 Flashing LED 1 lights (−)
3 Lithium battery electric (+)
4 Touch wire (−)
5 Motor (−)
6 Connection features IC & 5054B IC
7 Rechargeable LED 0 light (−)
8 Electric circuit (−)
5054B Rechargeable IC 37
1 Connection features IC & 5054B IC
2 Lithium battery electric (−)
3 Electric circuit (+) & Rechargeable LED 0 light (+)
4 Charging dock (+)
5 Charging dock (−)

What is claimed is:

1. A dynamic fishing lure comprising:
a fish structure having
an electric control circuit mounted therein;
a fishing hook holder mounted within the fish structure and extending out therefrom;
a battery in electric association with the electric control circuit and also mounted within the fish structure; and
a charging protrusion integral with and on an external surface of the fishing structure such that the charging protrusion has charging contacts embedded within it that are associated with the electric control circuit;
a triple sealing device entirely removable and re-attachable to the charging protrusion such that the triple sealing device has an integral curved cap portion and an integral cylinder portion; such that
the integral cylinder portion has an external surface that impacts an internal surface portion of the charging protrusion; and further
wherein the integral cylinder portion has a cavity that mounts onto one of the charging contacts mounted within the fish structure by insertion of said one of the charging contacts into the cavity; and
the integral curved cap portion has an internal curved surface forming a space between this internal curved surface and a portion of the integral cylinder portion such that the internal curved surface impacts an external portion of the charging protrusion.

2. A dynamic fishing lure comprising:
a fish structure having
a battery re-charging electric control circuit mounted therein;
a fishing hook holder mounted within the fish structure and extending out therefrom;
a re-chargeable battery in electric association with the battery re-charging electric control circuit and also mounted within the fish structure; and
a battery re-charging protrusion integral with and on an external surface of the fishing structure such that the battery re-charging protrusion has a battery re-charging channel therein and battery re-charging contacts embedded within the battery re-charging channel such that the battery re-charging contacts are associated with the battery re-charging electric control circuit wherein a battery re-charging increases an amount of charge stored on the re-chargeable battery;
a triple sealing device entirely removable and re-attachable to the battery re-charging charging protrusion such that the triple sealing device has an integral bowl shaped curved cap portion and an integral cylinder portion mounted in a center of the integral bowl shaped curved cap portion; such that
the integral cylinder portion has an external surface that impacts an internal surface portion of the battery re-charging protrusion; and further
wherein the integral cylinder portion has a cavity that mounts onto one of the battery re-charging contacts mounted within the fish structure by insertion of said one of the battery re-charging contacts into the cavity; and
the integral bowl shaped curved cap portion has an internal curved surface forming a space between this internal curved surface and a part of the integral cylinder portion such that the internal curved surface impacts an external portion of the battery re-charging protrusion and wherein the space surrounds an entire perimeter of the part of the integral cylinder portion.

\* \* \* \* \*